United States Patent
Ray et al.

(10) Patent No.: US 11,218,434 B2
(45) Date of Patent: Jan. 4, 2022

(54) AUDIO DATA PACKET STATUS DETERMINATION

(71) Applicant: GOOGLE LLC, Mountain View, CA (US)

(72) Inventors: Jonathan William Ray, Venice, CA (US); Farnaz Azmoodeh, Marina Del Rey, CA (US); Eric Wood, Los Angeles, CA (US); Congxing Cai, Los Angeles, CA (US); Paul Schelte Albert Reitsma, Marina Del Rey, CA (US); Glenn Wilson, Playa Vista, CA (US); Peng Zhang, Los Angeles, CA (US); Troy Louis Walker, Santa Monica, CA (US); Gaurav Bhaya, Mountain View, CA (US); Robert Stets, Mountain View, CA (US)

(73) Assignee: Google LLC, Mountain View, CA (US)

( * ) Notice: Subject to any disclaimer, the term of this patent is extended or adjusted under 35 U.S.C. 154(b) by 451 days.

(21) Appl. No.: 15/584,839

(22) Filed: May 2, 2017

(65) Prior Publication Data
US 2017/0236524 A1    Aug. 17, 2017

Related U.S. Application Data

(63) Continuation-in-part of application No. 15/091,323, filed on Apr. 5, 2016, now abandoned, which is a
(Continued)

(51) Int. Cl.
*G06Q 30/00* (2012.01)
*H04L 12/58* (2006.01)
(Continued)

(52) U.S. Cl.
CPC .............. *H04L 51/10* (2013.01); *G06F 3/165* (2013.01); *G06F 40/14* (2020.01);
(Continued)

(58) Field of Classification Search
CPC .................. G06Q 30/0207–30/0277
(Continued)

(56) References Cited

U.S. PATENT DOCUMENTS 6,044,347 A    3/2000  Abella et al.
6,275,806 B1   8/2001  Pertrushin
(Continued)

FOREIGN PATENT DOCUMENTS

JP    2011-210238    10/2011
KR    10-0481141 B1    3/2005
(Continued)

OTHER PUBLICATIONS

Abrams, Help users find, interact & re-engage with your app on the Google Assistant, Google Developers Blog, Nov. 15, 2017, 16 pages.
(Continued)

*Primary Examiner* — Waseem Ashraf
*Assistant Examiner* — Richard G Reinhardt
(74) *Attorney, Agent, or Firm* — Dority & Manning, P.A.

(57) ABSTRACT

Systems and methods to determine the status of transmitted audio packets. The audio packets can include digital components that are presented by a client computing device. Based on presentation variables and determinations of presentation status, the system can generate a predictive model that can be used to dynamically determines presentation values of audio packets prior to their transmission to a client computing device.

20 Claims, 11 Drawing Sheets

Related U.S. Application Data continuation of application No. 13/916,407, filed on Jun. 12, 2013, now abandoned, which is a continuation-in-part of application No. 15/395,682, filed on Dec. 30, 2016, now Pat. No. 10,013,978.

(51) Int. Cl.

| | | |
|---|---|---|
| *G10L 19/16* | (2013.01) | |
| *G06F 3/16* | (2006.01) | |
| *H04N 21/439* | (2011.01) | |
| *G06K 9/62* | (2006.01) | |
| *G06Q 30/02* | (2012.01) | |
| *G06K 9/00* | (2006.01) | |
| *G06F 40/14* | (2020.01) | |

(52) U.S. Cl.
CPC ....... *G06K 9/00469* (2013.01); *G06K 9/6202* (2013.01); *G06Q 30/02* (2013.01); *G06Q 30/0242* (2013.01); *G06Q 30/0254* (2013.01); *G06Q 30/0275* (2013.01); *G10L 19/167* (2013.01); *H04N 21/439* (2013.01)

(58) Field of Classification Search
USPC .................................................. 705/14, 319
See application file for complete search history.

(56) References Cited

U.S. PATENT DOCUMENTS

| | | | |
|---|---|---|---|
| 6,684,249 B1 | 1/2004 | Frerichs et al. | |
| 6,732,080 B1 | 5/2004 | Blants | |
| 6,857,007 B1 | 2/2005 | Bloomfield | |
| 6,907,566 B1 | 6/2005 | Mcelfresh et al. | |
| 7,668,754 B1 | 2/2010 | Bridgelall | |
| 7,853,255 B2 | 12/2010 | Karaoguz et al. | |
| 7,979,877 B2 | 7/2011 | Huber et al. | |
| 8,165,886 B1 | 4/2012 | Gagnon et al. | |
| 8,195,133 B2 | 6/2012 | Ramer et al. | |
| 8,249,925 B2 | 8/2012 | Broms et al. | |
| 8,370,197 B2 | 2/2013 | Axe et al. | |
| 8,386,386 B1 | 2/2013 | Zhu | |
| 8,666,807 B1 | 3/2014 | Murray et al. | |
| 8,849,694 B1 | 9/2014 | Chatterjee et al. | |
| 8,903,716 B2 | 12/2014 | Chen et al. | |
| 9,424,840 B1 | 8/2016 | Hart et al. | |
| 9,767,479 B2 | 9/2017 | Filev et al. | |
| 10,013,978 B1 | 7/2018 | Bhaya et al. | |
| 10,089,647 B2 | 10/2018 | Juhasz | |
| 2002/0102988 A1 | 8/2002 | Myllymaki | |
| 2002/0116287 A1 | 8/2002 | Schubert et al. | |
| 2002/0116313 A1 | 8/2002 | Detering | |
| 2004/0044516 A1 | 3/2004 | Kennewick et al. | |
| 2004/0193488 A1 | 9/2004 | Khoo et al. | |
| 2004/0203860 A1 | 10/2004 | Fellenstein et al. | |
| 2005/0267798 A1 | 12/2005 | Panara | |
| 2006/0224445 A1 | 10/2006 | Axe et al. | |
| 2007/0073723 A1 | 3/2007 | Ramer et al. | |
| 2007/0097975 A1 | 5/2007 | Rakers et al. | |
| 2007/0127688 A1 | 6/2007 | Doulton | |
| 2007/0197239 A1 | 8/2007 | Sane | |
| 2007/0281716 A1 | 12/2007 | Altman et al. | |
| 2008/0248815 A1 | 10/2008 | Busch | |
| 2008/0250453 A1* | 10/2008 | Smith ................... G06Q 30/02 725/39 |
| 2009/0030800 A1 | 1/2009 | Grois | |
| 2009/0070211 A1 | 3/2009 | Gonen | |
| 2009/0192929 A1 | 7/2009 | Hoeflinger et al. | |
| 2009/0204410 A1 | 8/2009 | Mozer et al. | |
| 2009/0228270 A1 | 9/2009 | Odell et al. | |
| 2009/0292587 A1 | 11/2009 | Fitzgerald | |
| 2009/0326966 A1* | 12/2009 | Callaghan ............. G06Q 30/02 705/1.1 |
| 2010/0010890 A1 | 1/2010 | Ditkovski et al. | |
| 2010/0023396 A1 | 1/2010 | Subramanian et al. | |
| 2010/0050098 A1 | 2/2010 | Turner | |
| 2010/0057639 A1 | 3/2010 | Schwarz et al. | |
| 2010/0088719 A1* | 4/2010 | Hawkins ............... H04H 20/14 725/34 |
| 2010/0176985 A1 | 7/2010 | Sharma | |
| 2010/0211439 A1* | 8/2010 | Marci ................... G06Q 10/10 705/7.29 |
| 2010/0292991 A1 | 11/2010 | Lv | |
| 2011/0035379 A1 | 2/2011 | Chen et al. | |
| 2011/0067099 A1 | 3/2011 | Barton et al. | |
| 2011/0078014 A1 | 3/2011 | Feldman et al. | |
| 2011/0208596 A1 | 8/2011 | Kwon et al. | |
| 2011/0246286 A1 | 10/2011 | Cetin et al. | |
| 2012/0030034 A1 | 2/2012 | Knapp et al. | |
| 2012/0041766 A1 | 2/2012 | Gong et al. | |
| 2012/0123856 A1 | 5/2012 | Paunikar et al. | |
| 2012/0130798 A1 | 5/2012 | Cooley et al. | |
| 2012/0180083 A1 | 7/2012 | Marcus | |
| 2012/0203627 A1 | 8/2012 | Balseiro et al. | |
| 2012/0265528 A1 | 10/2012 | Gruber et al. | |
| 2013/0036202 A1* | 2/2013 | Lahav ................... G06N 7/005 709/219 |
| 2013/0063550 A1 | 3/2013 | Ritchey et al. | |
| 2013/0066725 A1 | 3/2013 | Umeda | |
| 2013/0111487 A1 | 5/2013 | Cheyer et al. | |
| 2013/0117022 A1 | 5/2013 | Chen et al. | |
| 2013/0151332 A1* | 6/2013 | Yan ................... G06Q 30/0243 705/14.42 |
| 2013/0275164 A1 | 10/2013 | Gruber et al. | |
| 2013/0304758 A1 | 11/2013 | Gruber et al. | |
| 2013/0317823 A1 | 11/2013 | Mengibar | |
| 2014/0067455 A1 | 3/2014 | Zhang et al. | |
| 2014/0222436 A1 | 8/2014 | Binder et al. | |
| 2014/0278981 A1 | 9/2014 | Mersov et al. | |
| 2015/0194167 A1 | 7/2015 | Jeong | |
| 2015/0302458 A1* | 10/2015 | Dides ................... G06Q 30/0242 705/14.41 |
| 2015/0363748 A1 | 12/2015 | Beaurepaire et al. | |
| 2016/0042736 A1 | 2/2016 | Lee et al. | |
| 2016/0104200 A1 | 4/2016 | Osotio et al. | |
| 2016/0357519 A1 | 12/2016 | Vargas | |
| 2017/0034592 A1 | 2/2017 | Ray et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |
| 2018/0052573 A1 | 2/2018 | Comertoglu et al. | |
| 2018/0190276 A1 | 7/2018 | Bhaya et al. | |
| 2018/0308484 A1 | 10/2018 | Bhaya et al. | |

FOREIGN PATENT DOCUMENTS

| | | |
|---|---|---|
| KR | 10-2008-0072673 A | 8/2008 |
| KR | 10-2012-0110751 A | 10/2012 |
| KR | 10-2012-0137425 A | 12/2012 |
| WO | WO-2007/064482 A1 | 6/2007 |

OTHER PUBLICATIONS

Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.

(56) References Cited

OTHER PUBLICATIONS

Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion for PCT Appl. Ser. No. PCT/US2017/049709 dated Dec. 5, 2017, 12 pages.
Johnston, "Amazon Whirlwind: New Echo, Plus, Spot, Connect, Fire TV Take The Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
Buckland et al., "Amazon's Alexa Takes Open-Source Route to Beat Google Into Cars", Bloomberg, Feb. 27, 2018, 6 pages.
Communication pursuant to Article 94(3) EPC for EP Application No. 17772516.5 dated Mar. 27, 2019.
Final Office Action on U.S. Appl. No. 15/596,943 dated Apr. 9, 2019.
Non-Final Office Action on U.S. Appl. No. 15/091,323 dated Feb. 25, 2019.
Non-Final Office Action on U.S. Appl. No. 15/498,237 dated Feb. 8, 2019.
Non-Final Office Action on U.S. Appl. No. 15/596,943 dated Dec. 19, 2018.
Non-Final Office Action on U.S. Appl. No. 15/632,924 dated May 1, 2019.
Notice of Reasons for Rejection for JP Application No. 2017-556903 dated Feb. 25, 2019.
Office Action for Korean Patent Application No. 10-2017-7031607 dated Jan. 24, 2019.
U.S. Notice of Allowance for U.S. Appl. No. 15/395,682 dated Feb. 26, 2018. 9 pages.
U.S. Notice of Allowance for U.S. Appl. No. 15/395,682 dated Feb. 26, 2018.
Foreign Action other than Search Report on KR 10-2017-7031607, dated Jul. 26, 2019, 7 pages.
Notice of Allowance on U.S. Appl. No. 15/498,237, dated Aug. 12, 2019, 8 pages.
Examination Report for AU Appln. Ser. No. 2020201889 dated Sep. 4, 2020 (4 pages).
Office Action for KR Appln. Ser. No. 10-2020-7014345 dated Sep. 17, 2020 (15 pages).
Notice of Allowance for U.S. Appl. No. 15/596,943 dated Jun. 5, 2020 (10 pages).
Peterson, et al., "Location-Based Advertising: The Key to Unlocking the Most Value in the Mobile Advertising and Location-Based Services Markets", Peterson Mobility Solutions, Dec. 2009, available at URL: https://www.mmaglobal.com/files/PetersonMobility_20100217144146.pdf, pp. 1-39 (39 pages).
Non-Final Office Action for U.S. Appl. No. 15/596,943 dated Dec. 10, 2019 (23 pages).
Decision to Grant a Patent for JP 2017-556903 dated Oct. 7, 2019 (5 pages).
Non-Final Office Action for U.S. Appl. No. 15/632,924 dated Oct. 9, 2019 (17 pages).
Non-Final Office Action for U.S. Appl. No. 16/018,854 dated Oct. 4, 2019 (23 pages).
Reason for Refusal for KR 10-2017-7031607 dated Sep. 16, 2019 (7 pages).
Final Office Action for U.S. Appl. No. 15/596,943 dated Mar. 30, 2020 (22 pages).
Finch, Dezon K., "TagLine: Information Extraction for Semi-Structured Text Elements in Medical Progress Notes", Scholar Commons, Graduate Theses and Dissertations, University of South Florida, Jan. 2012, retrieved Mar. 25, 2020 from URL: http://scholarcommons.usf.edu/etd/4321 (251 pages).
Nahm, Un Yong, "Text Mining with Information Extraction", May 30, 2010, retrieved Mar. 25, 2010 from URL: http://neuro.bstu.by/al/Data-mining/ut-ai-tr04-311.pdf (132 pages).
Notice of Allowance for U.S. Appl. No. 15/632,924 dated Mar. 31, 2020 (13 pages).
Shanahan, Matt, "Attention Economics Pricing in Advertising: Cost Per Second", Ad Exchanger, Ad Traders, Oct. 19, 2010, retrieved Mar. 24, 2020 from URL: https://adexchanger.com/data-driven-thinking/attention-economics/ (7 pages).
U.S. Appl. No. 13/532,209, filed Jun. 25, 2012.
"Amazon and Google Want to Turn Their Smart Home Speakers Into Telephone Replacements—Mac Rumors" MacRumors, 9 pages.
"Apple Patent Reveals a New Security Feature Coming to Siri" 6 pages.
"Going with CPT (cost per time) over CPM for Ads", Startup Nation Business Forum, http://www.startupnation.com/Going-with-CPT-cost-per-time-over-CPM-for-ads/topic/S, Dec. 4, 2010, 3 pgs. [Retrieved from website Jun. 11, 2013].
"Going with CPT (cost per time) over CPM for Ads", Startup Nation Business Forum, 3 pages.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
Ad Traders, "Attention Economics Pricing in Advertising: Cost Per Second" Ad Exchanger, 5 pages.
Ad Traders, "Attention Economics Pricing in Advertising: Cost Per Second", Ad Exchanger, http://www.adexchanger.com/data-driven-thinking/attention-economics/, Oct. 19, 2010, [Retrieved from website Jun. 22, 2015].
Anita Wilhelm, Yuri Takhteyev, Risto Sarvas, Nancy Van House, and Marc Davis. 2004. Photo annotation on a camera phone. In CHI '04 Extended Abstracts on Human Factors in Computing Systems (CHI EA '04). ACM, New York, NY, USA, 1403-1406. DOI=http://dx.doi.org/10.1145/985921.986075.
Broussard, Mitchel, "Chatbot-Like Siri Patent Includes Intelligent Image, Video, and Audio Recognition Within Messages", MacRumors, May 11, 2017, 11 pages.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time.com (2 pages).
Collins, Terry "Can Twitter Save itself? The Social Network is Slowly gaining users, but still Lags Far Behind Rivals. Is a Turnaround Possible?" 3 pages.
Cook, "A Siri for advertising: These mobile ads talk back to you," Web Article, Apr. 1, 2013, Geekwire.com (7 pages).
Donald J. Patterson, Xianghua Ding, Nicholas Noack. 2006. Nomatic: Location by, for, and of crowds. Proceedings of International Workshop On Location- and Context-Awareness LoCA 2006. 186-203. DOI=10.1007/11752967_13.
Forrest, Conner, "Essential Home wants to be 'bridge' between Amazon Alexa, Apple's Siri, and Google Assistant," TechRepublic, May 31, 2017, 9 pages.

(56) References Cited

OTHER PUBLICATIONS

Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . .'" Cnet, May 18, 2017, 7 pages.
Giovanni Iachello, Ian Smith, Sunny Consolvo, Gregory D. Abowd, Jeff Hughes, James Howard, Fred Potter, James Scott, Timothy Sohn, Jeffrey Hightower, Anthony LaMarca. 2005. Control, Deception, and Communication: Evaluating the Deployment of a Location-Enhanced Messaging Service. In 7th International Conference, UbiComp 2005, Tokyo, Japan, Sep. 11-14, 2005. Proceedings, 213-231. DOI=10.1007/11551201_13.
Giovanni Iachello, Ian Smith, Sunny Consolvo, Mike Chen, and Gregory D. Abowd. 2005. Developing privacy guidelines for social location disclosure applications and services. In Proceedings of the 2005 symposium on Usable privacy and security (SOUPS '05). ACM, New York, NY, USA, 65-76. DOI=http://dx.doi.org/10.1145/1073001.1073008.
Golgowski, Nina, "This Burger King Ad is Trying to Control Your Google Home Device", Apr. 12, 2017, 7 pages.
Google Developers Newsletter "Google Assistant SDK", developers.google.com, 2 pages.
Gurma, Mark and Webb, Alex, "Apple is Manufacturing a Siri Speaker to Outdo Google and Amazon", Bloomberg, May 31, 2017, 3 pages.
Ian Smith, Sunny Consolvo, Anthony Lamarca, Jeffrey Hightower, James Scott, Timothy Sohn, Jeff Hughes, Giovanni Iachello, Gregory D. Abowd. 2005. Social Disclosure of Place: From Location Technology to Communication Practices. Third International Conference, PERVASIVE 2005. 134-151. DOI=10.1007/11428572_9.
Ian Smith. 2005. Social-Mobile Applications. Computer 38, 4 (Apr. 2005), 84-85. DOI=http://dx.doi.org/10.1109/MC.2005.140.
International Preliminary Report on Patentability for PCT/US2013/047593 dated Jan. 8, 2015.
International Preliminary Report on Patentability on PCT/US2014/036341 dated Dec. 15, 2015, 6 pgs.
International Search Report and Written Opinion in PCT Application No. PCT/US2014/036341 dated Sep. 2, 2014.
International Search Report and Written Opinion on PCT/US2013/047593 dated Nov. 4, 2013.
Juhong Liu, O. Wolfson and Huabei Yin. 2006. Extracting Semantic Location from Outdoor Positioning Systems. 7th International Conference on Mobile Data Management. doi: 10.1109/MDM.2006.87.
Koetsier, John, "Ads On Amazon Echo: Wendy's, ESPN, and Progressive Among Brands Testing", Forbes, May 11, 2017, 3 pages.
Larson, Selena "Google Home Now Recognizes your Individual Voice" dated Apr. 20, 2017, 3 pages.
Lee, Dave, "The five big announcements from Google I/O", BBC, May 18, 2017, 11 pages.
Marc Davis, Michael Smith, Fred Stentiford, Adetokunbo, John Canny, Nathan Good, Simon King, Rajkumar Janakiraman. 2006. Using context and similarity for face and location identification. In Proceedings of the IS&T/SPIE 18th Annual Symposium on Electronic Imaging Science and Technology.
Marc Davis, Nancy Van House, Jeffrey Towle, Simon King, Shane Ahern, Carrie Burgener, Megan Finn, Vijay Viswanathan, Matthew Rothenberg. 2005. MMM2: Mobile Media Metadata for Media Sharing. In Extended Abstracts of the Conference on Human Factors in Computing Systems. ACM, New York, NY, USA, 1335-1338.
Marc Davis, Simon King, Nathan Good, and Risto Sarvas. 2004. From context to content: leveraging context to infer media metadata. In Proceedings of the 12th annual ACM international conference on Multimedia (Multimedia '04). ACM, New York, NY, USA, 188-195. DOI=http://dx.doi.org/10.1145/1027527.1027572.
Nieva, Richard, "Google Home and eBay can tell you how much that's worth", 3 pages.

Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Risto Sarvas, Erick Herrarte, Anita Wilhelm, and Marc Davis. 2004. Metadata creation system for mobile images. In Proceedings of the 2nd international conference on Mobile systems, applications, and services (MobiSys '04). ACM, New York, NY, USA, 36-48. DOI=http://dx.doi.org/10.1145/990064.990072.
Sablich, Justin, "Planning a Trip With the Help of Google Home", New York Times, dated May 31, 2017, 6 pages.
Seifert, Dan "Samsung's New Virtual Assistant Will Make Using Your Phone Easier", Mar. 20, 2017, 7 pages.
Sherr, Ian "IBM Built a Voice Assistant For Cybersecurity" dated Feb. 13, 2017, 4 pages.
Siegal, Daniel, "IP Attys Load Up Apps' Legal Challenges At Silicon Beach" 6 pages.
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Spalding, Steve, "How to Cost User Engagement", How to Spilt an Atom—Ideas Reborn, 4 pages.
Spalding, Steve, "How to Cost User Engagement", How to Split an Atom—Ideas Reborn, http://howtosplitanatom.com/how-to-read-shorts/how-to-cost-user-engagement/, Sep. 20, 2007, [Retrieved from website Jun. 22, 2015].
Takashi Yoshino, Tomohiro Muta and Jun Munemori. 2002. NAMBA: location-aware collaboration system for shopping and meeting. IEEE Transactions on Consumer Electronics, vol. 48, No. 3. 470-477. doi: 10.1109/TCE.2002.1037030.
U.S. Notice of Allowance on U.S. Appl. No. 13/532,209 dated Jul. 10, 2017.
U.S. Notice of Allowance on U.S. Appl. No. 13/532,209 dated Mar. 31, 2017.
U.S. Notice of Allowance on U.S. Appl. No. 13/790,087 dated Jan. 6, 2016.
U.S. Office Action on U.S. Appl. No. 13/532,209 dated Nov. 4, 2013.
U.S. Office Action on U.S. Appl. No. 13/532,209 dated Jul. 3, 2013.
U.S. Office Action on U.S. Appl. No. 13/532,209 dated Mar. 4, 2014.
U.S. Office Action on U.S. Appl. No. 13/532,209 dated Oct. 28, 2016.
U.S. Office Action on U.S. Appl. No. 13/790,087 dated Jan. 26, 2017.
U.S. Office Action on U.S. Appl. No. 13/790,087 dated Jun. 9, 2016.
U.S. Office Action on U.S. Appl. No. 13/916,407 dated Jun. 19, 2015.
U.S. Office Action on U.S. Appl. No. 13/916,407 dated Nov. 17, 2015.
U.S. Office Action on U.S. Appl. No. 13/972,379 dated Jun. 24, 2015.
Willens, Max, "For publishers, Amazon Alexa holds promise but not much money (yet)", Digiday, Jul. 6, 2017, 5 pages.
Notice of Allowance for U.S. Appl. No. 16/018,854 dated Jul. 30, 2020 (8 pages).
Examination Report for AU 2017386093 dated Nov. 29, 2019 (2 pages).
Notice of Allowance for U.S. Appl. No. 15/498,237 dated Nov. 29, 2019 (6 pages).
Examination Report for IN Appln. Ser. No. 201747039586 dated Jan. 24, 2020 (6 pages).
Final Office Action for U.S. Appl. No. 16/018,854 dated Mar. 9, 2020 (27 pages).

(56) References Cited

OTHER PUBLICATIONS

Final Office Action on U.S. Appl. No. 13/790,121 dated Dec. 17, 2014 (5 pages).
Non-Final Office Action on U.S. Appl. No. 13/790,121 dated Aug. 13, 2014 (6 pages).
Notice of Allowance on U.S. Appl. No. 13/790,121 dated Aug. 27, 2015 (8 pages).
Notice of Allowance on U.S. Appl. No. 13/790,121 dated Jun. 9, 2014 (8 pages).
"Walmart and Google to offer voice-enabled shopping", BBC News, Aug. 23, 2017 (10 pages).
Crist, Ry, "Logitech Harmony's Alexa Skill just got a whole lot better", cnet, Jul. 13, 2017 (2 pages).
Gibbs, Samuel, "Your Facebook Messenger app is about to be filled with ads", The Guardian, Jul. 12, 2017 (3 pages).
Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
U.S. Office Action on U.S. Appl. No. 12/851,833 dated Aug. 8, 2012, (10 pages).
Notice of Allowance for U.S. Appl. No. 15/596,943 dated Nov. 25, 2020 (10 pages).
Reasons for Rejection for JP Appln. Ser. No. 2019-200982 dated Nov. 16, 2020 (9 pages).
Examination Report for EP Appln. Ser. No. 17772516.5 dated Jun. 25, 2021 (5 pages).
First Office Action for CN Appln. Ser. No. 201780001427.5 dated May 19, 2021 (10 pages).

\* cited by examiner

AUDIO DATA PACKET STATUS DETERMINATION

CROSS-REFERENCE TO RELATED APPLICATIONS

The present application claims priority as a continuing-in-part under 35 U.S.C. § 120 to U.S. patent application Ser. No. 15/091,323, filed Apr. 5, 2016, which claims priority as a continuing patent application under 35 U.S.C. § 120 to U.S. patent application Ser. No. 13/916,407, filed Jun. 12, 2013. This application also claims the benefit and priority under 35 U.S.C. § 120 as a continuation-in-part of U.S. patent application Ser. No. 15/395,682, filed Dec. 30, 2016. The contents of the foregoing applications are herein incorporated by reference in its entirety.

BACKGROUND

In a networked environment, such as the Internet or other networks, first-party content providers can provide information for public presentation on resources, for example web pages, documents, applications, and/or other resources. The first-party content can include information provided by the first-party content providers via, for example, a resource server for presentation on a user device over the Internet. Additional third-party content can also be provided by service provider devices for presentation on the user device together with the first-party content provided by the first-party content providers. Thus, a person viewing a resource can access the first-party content that is the subject of the resource, as well as the third-party content that may or may not be related to the subject matter of the resource.

SUMMARY

According to one aspect of the disclosure, a system to determine data status includes a data processing system that can include a memory and one or more processors. The data processing system can transmit, to a first client computing device, a first audio signal that can include a digital component. The data processing system can determine a presentation status of the digital component within the first audio signal. The presentation status can indicate whether the digital component was presented via the first client computing device. The data processing system can receive, from the first client computing device, first presentation variables. The data processing system can generate a presentation probability predictive model based on the presentation status of the digital component, the first presentation variables, and a data set that can include prior presentation statuses and prior presentation variables determined for a plurality of client computing devices previously served an audio signal. The data processing system can receive, from the first client computing device, a request and second presentation variables. The data processing system can determine a presentation value for each of a plurality of candidate digital components based on the second presentation variables and the presentation probability predictive model. The data processing system can select a second digital component from the plurality of candidate digital components for transmission to the first client computing device within a second audio signal responsive a ranking of the presentation values for each of the plurality of candidate digital components.

According to another aspect of the disclosure can include a method to determine data status. The method can include transmitting, to a first client computing device, a first audio signal that can include a digital component. The method can include determining a presentation status of the digital component within the first audio signal. The presentation status can indicate whether the digital component was presented via the first client computing device. The method can include receiving, from the first client computing device, first presentation variables. The method can include generating a presentation probability predictive model based on the presentation status of the digital component, the first presentation variables, and a data set comprising prior presentation statuses and prior presentation variables determined for a plurality of client computing devices previously served an audio signal. The method can include receiving, from the first client computing device, a request and second presentation variables. The method can include determining a presentation value for each of a plurality of candidate digital components based on the second presentation variables and the presentation probability predictive model. The method can include selecting a second digital component from the plurality of candidate digital components for transmission to the first client computing device within a second audio signal responsive a ranking of the presentation values for each of the plurality of candidate digital components.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1A:
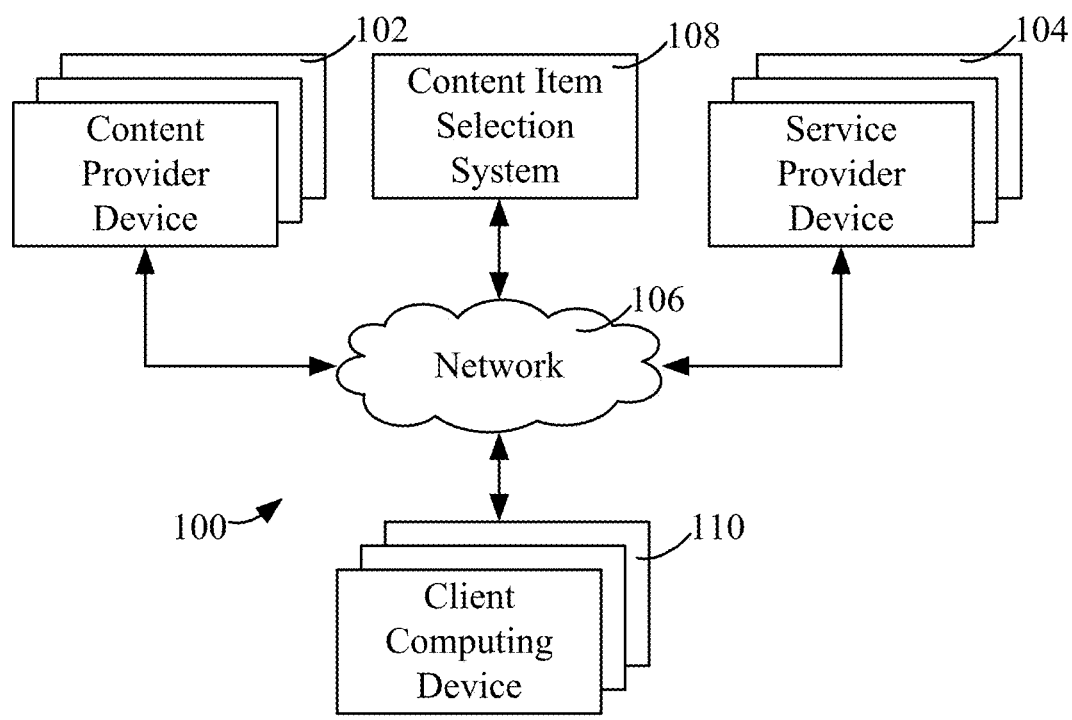
FIG. 1A is an overview depicting an example of a system for providing information via a network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

Systems and methods of the present disclosure relate generally to a data processing system that optimizes or dynamically adjusts an order of processing sequence dependent operations via data packet based transmissions in a voice activated computer network environment. The data processing system can improve the efficiency and effectiveness of data packet transmission over one or more computer networks by, for example, asynchronously, out-of-sequence, or dynamically selecting operations from a plurality of sequence dependent operations. Data packets or other protocol based signals corresponding to the selected operations can be routed through a computer network between multiple computing devices. The data processing system can temporarily or permanently skip initial operations of a set of sequence dependent operations and can instead proceed to an operation that corresponds to a later-in-time or final operation. By bypassing packet or other protocol based data transmissions that correspond to an early operation of a plurality of sequence dependent operations, and instead proceeding directly to packet or other protocol based data transmissions for later stage operations in a sequence of operations the data processing system can reduce, delay, or eliminate data processing associated with the early stage operations. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives an input audio query. From the input audio query the data processing system can identify a request and a trigger keyword corresponding to the request. Based on the trigger keyword or the request, the data processing system can determine a thread that indicates a plurality of sequence dependent operations. For example, the thread can indicate a first action, a second action that is subsequent to the first action, and a third action that is subsequent to the second action. The third action, which in this example is the last action in a thread of sequence dependent operations, can be used by the data processing system to select a content item prior to occurrence of the first action and prior to occurrence of the second action. This can be done before or without performing at least some of the data processing operations based on the first action or the second action. Bypassing these processing operations causes the content item for the third action to be selected with less data processing and less electrical power usage than would be the case without the bypass.

The content item can include an output signal. The content item can include a digital component. In some implementations, the content item is a digital component. In other implementations, the content item is a component of the digital component. The data processing system can provide the content item including the output signal by packet or other protocol based data message transmission via a computer network to a client computing device. The output signal can cause an audio driver component of the client computing device to generate an acoustic wave, e.g., an audio output, which can be output from the client computing device. The audio output corresponds to the third (e.g., last or latest in time) action and can by output from the client computing device prior to occurrence of the first action or prior to occurrence of the second action. The bypassing of the first and second actions (or the bypassing of selecting and providing content items corresponding to these actions) to first select and send the content item corresponding to the third action prior to occurrence of the first and second sequence dependent actions results in fewer data processing operations, less memory usage, and less network bandwidth utilization than would be the case without the bypass.

A computing device (e.g., a user device) can view a resource, such as a web page, via the Internet by communicating with a server, such as a web page server, corresponding to that resource. The resource includes first-party content that is the subject of the resource from a first-party content provider, as well as additional third-party provided content, such as advertisements or other content. In one implementation, responsive to receiving a request to access a web page, a web page server and/or a user device can communicate with a data processing system, such as a content item selection system, to request a content item to be presented with the requested web page. The content item selection system can select a third-party content item and provide data to effect presentation of the content item with the requested web page on a display of the user device. In some instances, the content item is selected and served with a resource associated with a search query response. For example, a search engine may return search results on a search results web page and may include third-party content items related to the search query in one or more content item slots of the search results web page.

In some instances, a device identifier is associated with the user device. The device identifier may include a randomized number associated with the user device to identify the device during subsequent requests for resources and/or content items. In some instances, the device identifier is configured to store and/or cause the user device to transmit information related to the user device to the content item selection system and/or resource server (e.g., a web browser type, an operating system, prior resource requests, prior content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A service provider device, when providing third-party content items for presentation with requested resources via the Internet or other network, may utilize a content item management service to control or otherwise influence the selection and serving of the third-party content items. For instance, a service provider device may specify selection criteria (such as keywords) and corresponding bid values that are used in the selection of the third-party content items. The bid values may be utilized by the content item selection system in an auction to select and serve content items for display with a resource. For example, a service provider device may place a bid in the auction that corresponds to an agreement to pay a certain amount of money if a user interacts with the provider's content item (e.g., the provider agrees to pay $3 if a user clicks on the provider's content item). In other examples, a service provider device may place a bid in the auction that corresponds to an agreement to pay a certain amount of money if the content item is selected and served (e.g., the provider agrees to pay $0.005 each time a content item is selected and served). In some instances, the content item selection system uses content item interaction data to determine the performance of the service provider device's content items. For example, users may be more inclined to click on third-party content items on certain web pages over others. Accordingly, auction bids to place the third-party content items may be higher for high-performing web pages, categories of web pages, and/or other criteria, while the bids may be lower for low-performing web pages, categories of web pages, and/or other criteria.

In some instances, a web page or other resource (such as, for example, an application) includes one or more content item slots in which a selected and served third-party content item may be displayed. The code (e.g., JavaScript®, HTML, etc.) defining a content item slot for a web page or other resource may include instructions to request a third-party content item from the content item selection system to be displayed with the web page.

The selected and served content item displayed in a content item slot for the web page or other resource may not be within a viewable region of a display of a user device. For example, a web page may include additional content, including third-party content items in content item slots, which is not visible when the web page is initially displayed on a display of a user device. Such additional content, including third-party content items, may not be visible based on a variety of visibility variables. For example, a height of a web browser window, a width of a web browser window, a type of user device, a display type of a user device, dimensions of the display, a display resolution, a text size setting of the web browser of the user device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser, a position of the content item slot in the web page, a type of web browser, whether third-party content item blocking services are implemented, and/or any other variable associated with the visibility of the additional content. In some instances, a user interacts with the user device to cause the additional content, including the third-party content items displayed in the content item slots, to become visible, such as through the use of an input device to scroll along the web page (e.g., via a mouse, touch screen, microphone, or other input device). In other instances, the user may navigate away from the web page without the additional content becoming visible.

During an auction for a content item slot for a resource, such as a web page, several different types of bid values may be utilized by service provider devices for various third-party content items. For example, an auction may include bids based on whether a user clicks on the third-party content item, whether a user performs a specific action based on the presentation of the third-party content item, whether the third-party content item is selected and served, and/or other types of bids. For example, a bid based on whether the third-party content item is selected and served may be a lower bid (e.g., $0.005) while a bid based on whether a user performs a specific action may be a higher bid (e.g., $5). In some instances, the bid may be adjusted to account for the probability associated with the bid. For example, the probability of the user performing the specific action may be low, such as 0.2%, while the probability of the selected and served third-party content item may be 100% (e.g., the selected and served content item will occur if it is selected during the auction, so the bid is unadjusted). Accordingly, a value may be generated to be used in the auction based on the bid value and the probability or other modifying value associated with the bid. In the prior example, the value for the bid based on whether the third-party content item is selected and served is $0.005*1.00=0.005 and the value for the bid based on whether a user performs a specific action is $5*0.002=0.01. To maximize the income generated, the content item selection system may select the third-party content item with the highest value from the auction. Thus, the content item selection system may select the content item associated with the bid based on whether the user performs the specific action.

In instances where service provider device places a bid based on whether the third-party content item is selected and served, the service provider device may pay or be billed for the selected and served third-party content item regardless of whether the served third-party content item is within a viewable region of a display of a user device to be viewed by a user or not. Thus, in some instances, a service provider device may pay or be billed for selected and served content items that are not seen by a user (for example, the content item may be served in a content item slot on a lower portion of a web page and the user may not scroll down far enough for the content item to be visible). A service provider device may prefer to bid on and/or pay for third-party content items that are viewed by a user (e.g., are within a viewable region of a display of a user device).

The content item selection system may permit a service provider device to submit bids based on whether a content item is viewed and may include a view probability prediction model that outputs a view probability that a selected and served content item will be viewed by a user. The view probability is a probability that a selected and served content item or a portion thereof will be displayed in a viewable region of a display of a user device (e.g., visible on the screen of a user device).

The view probability prediction model may be generated based on prior data for whether a content item was viewed and one or more viewability variables. The viewability variables may be based on characteristics of the user device (e.g., a type of user device, a display type of a user device, dimensions of the display), characteristics of a web browser executed on the user device (e.g., a type of web browser), settings associated with the user device (e.g., a display resolution, whether third-party content item blocking services are implemented), settings associated with the web browser executed on the user device (e.g., a height of a web browser window, a width of a web browser window, a text size setting of the web browser of the user device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser, formulae derived from dimensions of a web browser window and/or location of an area where a content item may be shown), and/or characteristics of the resource with which the content item is to be presented (e.g., a position of the content item slot in the resource, a category of the resource, a type of the resource, an interactivity level of the resource, a ranking of the resource, a popularity of the resource, dimensions of an area where a content item may be shown, part or all of an address of the resource).

The content item selection system receives one or more current viewability variables for a content item slot of a resource for an auction to select and serve a third-party content item for that content item slot. The one or more current viewability variables may similarly include characteristics of the user device (e.g., a type of user device, a display type of a user device, dimensions of the display), characteristics of a web browser executed on the user device (e.g., a type of web browser), settings associated with the user device (e.g., a display resolution, whether third-party content item blocking services are implemented), settings associated with the web browser executed on the user device (e.g., a height of a web browser window, a width of a web browser window, a text size setting of the web browser of the user device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser, formulae derived from dimensions of a web browser window and/or location of an area where a content item may be shown), and/or characteristics of the resource with which the content item is to be presented (e.g., a position of the content item slot in the resource, a category of the resource, a type of the resource, an interactivity level of the resource, a ranking of the resource, a popularity of the resource, dimensions of an area where a content item may be shown, part or all of an address of the resource).

The one or more current viewability variables are input into the view probability predictive model to determine a view probability. A bid is determined based on the view probability of a content item output by the view probability predictive model for the auction. The values associated with each content item in the auction may be compared and the highest value is selected. Data to effect display of the selected content item may be output to the user device such that the selected content item may be shown on a display of the user device.

A script may be included with the data to effect display of the selected content item. The script may be configured to send data to the content item selection system and/or another system in response to an indication that the content item was viewed (e.g., displayed in a viewable region of a display of a user device). The content item selection system and/or another system may then bill the service provider device for the viewed content item.

In some instances, the data indicating that the content item was viewed and the received current viewability variables may be utilized to further update and refine the view probability predictive model.

While the foregoing has provided an overview of a content item selection system that permits the use of a bid based on whether a content item is viewed and a view probability predictive model, more specific examples and systems to implement such a system will now be described.

FIG. 1A is a block diagram of an example system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system or processing module, such as a content item selection system 108. The content item selection system 108 can include at least one logic device, such as a computing device having a data processor, to communicate via the network 106, for example with a service provider device 104, a client computing device 110, and/or a content provider device 102. The content provider device can also be referred to as a third-party content server. The service provider device can also be referred to as a resource server. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processing module may process instructions and output data to effect presentation of one or more content items to the service provider device 104 and/or the client computing device 110. In addition to the processing circuit, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The client computing device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory, i.e., a processing module. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®.

The client computing device 110 can execute a software application (e.g., a web browser or other application) to retrieve content from other computing devices over network 106. Such an application may be configured to retrieve first-party content from a service provider device 104. In some cases, an application running on the client computing device 110 may itself be first-party content (e.g., a game, a media player, etc.). In one example, the client computing device 110 may execute a web browser application which provides a browser window on a display of the user device. The web browser application that provides the browser window may operate by receiving input of a uniform resource locator (URL), such as a web address, from an input device (e.g., a pointing device, a keyboard, a touch screen, or another form of input device). In response, one or more processors of the user device executing the instructions from the web browser application may request data from another device connected to the network 106 referred to by the URL address (e.g., a service provider device 104). The other device may then provide web page data and/or other data to the client computing device 110, which causes visual indicia to be displayed by the display of the client computing device 110. Accordingly, the browser window displays the retrieved first-party content, such as web pages from various websites, to facilitate user interaction with the first party content.

The service provider device 104 can include a computing device, such as a server, configured to host a resource, such as a web page or other resource (e.g., articles, comment threads, music, video, graphics, search results, information feeds, etc.). The service provider device 104 may be a computer server (e.g., a file transfer protocol (FTP) server, file sharing server, web server, etc.) or a combination of servers (e.g., a data center, a cloud computing platform, etc.). The service provider device 104 can provide resource data or other content (e.g., text documents, PDF files, and other forms of electronic documents) to the client computing device 110. In one implementation, the client computing device 110 can access the service provider device 104 via the network 106 to request data to effect presentation of a resource of the service provider device 104.

One or more service provider devices may have content provider device 102 to directly or indirectly provide data for third-party content items to the content item selection system 108 and/or to other computing devices via network 106. The content items may be in any format that may be presented on a display of a client computing device 110, for example, graphical, text, image, audio, video, etc. The content items may also be a combination (hybrid) of the formats. The content items may be banner content items, interstitial content items, pop-up content items, rich media content items, hybrid content items, etc. The content items may also include embedded information such as hyperlinks, metadata, links, machine-executable instructions, annotations, etc. In some instances, the content provider device 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a service provider device 104, a client computing device 110, and/or any other computing device. The service provider device 104 may be owned or ran by a first-party content provider that may include instructions for the content item selection system 108 to provide third-party content items with one or more resources of the first-party content provider on the service provider device 104. In one implementation, the resource may include a web page. The client computing device 110 may be a computing device operated by a user (represented by a device identifier), which, when accessing a resource of the service provider device 104, can make a request to the content item selection system 108 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, a type of user device, a display type of a user device, dimensions of the display, a display resolution, whether third-party content item blocking services are implemented, a height of a web browser window, a width of a web browser window, a text size setting of the web browser of the user device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser, etc.) and resource information (e.g., URL of the requested resource, one or more keywords of the content of the requested resource, text of the content of the resource, a title of the resource, a position of the content item slot in the resource, a category of the resource, a type of the resource, an interactivity level of the resource, a ranking of the resource, a popularity of the resource, etc.). The information that the content item selection system 108 receives can include a HyperText Transfer Protocol (HTTP) cookie which contains a device identifier (e.g., a random number) that represents the client computing device 110. In some implementations, the device information and/or the resource information may be appended to a content item request URL (e.g., http://contentitem.item/page/contentitem?devid=abc123&devnfo=A34r0). The requesting device information and/or the resource information may be utilized by the content item selection system 108 to select third-party content items to be served with the requested resource and presented on a display of a client computing device 110.

In some instances, a resource of a service provider device 104 may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a client computing device 110. The search results may include web page titles, hyperlinks, etc. One or more third-party content items may also be presented with the search results in a content item slot of the search result web page. Accordingly, the service provider device 104 and/or the client computing device 110 may request one or more content items from the content item selection system 108 to be presented in the content item slot of the search result web page. The content item request may include additional information, such as the user device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the service provider device may manage the selection and serving of content items by content item selection system 108. For example, the service provider device may set bid values and/or selection criteria via a user interface that may include one or more content item conditions or constraints regarding the serving of content items. A service provider device may specify that a content item and/or a set of content items should be selected and served for client computing devices 110 having device identifiers associated with a certain geographic location or region, a certain language, a certain operating system, a certain web browser, etc. In another example, the service provider device may specify that a content item or set of content items should be selected and served when the resource, such as a web page, document, etc., contains content that matches or is related to certain keywords, phrases, etc. The service provider device may set a single bid value for several content items, set bid values for subsets of content items, and/or set bid values for each content item. The service provider device may also set the types of bid values, such as bids based on whether a user clicks on the third-party content item, whether a user performs a specific action based on the presentation of the third-party content item, whether the third-party content item is selected and served, and/or other types of bids.

Figure 1B:
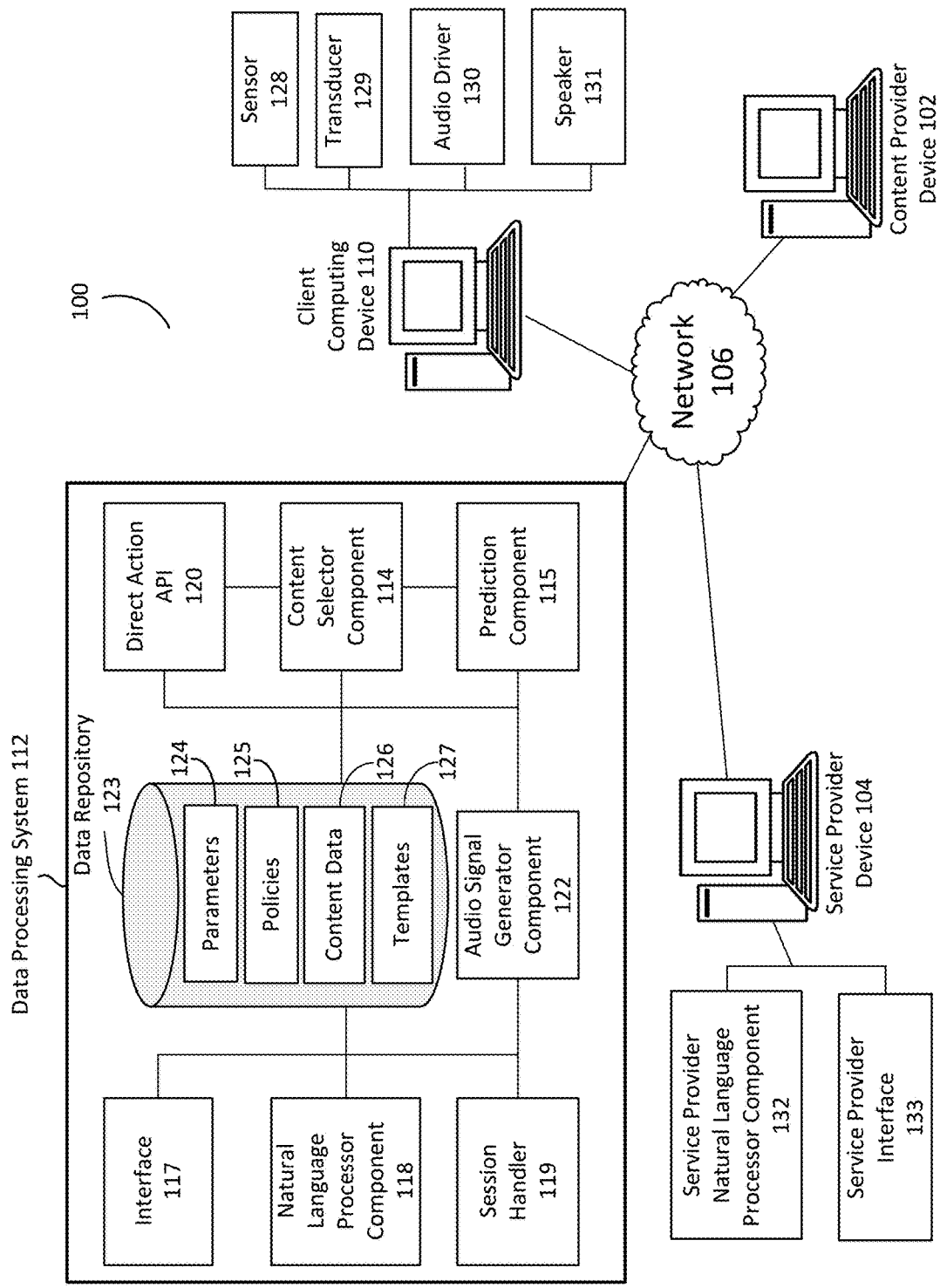
FIG. 1B depicts a system to optimize processing of sequence dependent operations in a voice activated computer network environment.

FIG. 1B depicts an example system 100 to optimize processing of sequence dependent operations in a voice activated data packet (or other protocol) based computer network environment. The system 100 can include at least one data processing system 112. The data processing system 112 can be a component of the content item selection system 108. In other implementations, the content item selection system 108 can be a component of the data processing system 112. The data processing system 112 can include at least one server having at least one processor. For example, the data processing system 112 can include a plurality of servers located in at least one data center or server farm. The data processing system 112 can determine, from an audio input signal a request and a trigger keyword associated with the request. Based on the request and trigger keyword the data processing system 112 can determine or select a thread than includes a plurality of sequence dependent operations, and can select content items (and initiate other actions as described herein) in an order that does not match the sequence of dependent operations, for example as part of a voice activated communication or planning system. The content items can include one or more audio files that when rendered provide an audio output or acoustic wave. The content items can include other content (e.g., text, video, or image content) in addition to or instead of audio content. For example, the content items can include text or image files, or combinations thereof, that do not include audio files and that do not render audio output.

The data processing system 112 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 112 can include servers in a data center that are stored in one or more high-density rack systems, along with associated storage systems, located for example in an enterprise data center. The data processing system 112 with consolidated servers in this way can improve system manageability, data security, the physical security of the system, and system performance by locating servers and high performance storage systems on localized high performance networks. Centralization of all or some of the data processing system 112 components, including servers and storage systems, and coupling them with advanced system management tools allows more efficient use of server resources, which saves power and processing requirements and reduces bandwidth usage.

The data processing system 112 can include at least one natural language processor (NLP) component 118, at least one interface 117, at least one prediction component 115, at least one content selector component 114, at least one audio signal generator component 122, at least one direct action application programming interface (API) 135, at least one session handler component 119, and at least one data repository 123. The NLP component 118, interface 117, prediction component 115, content selector component 114, audio signal generator component 122, direct action API 120, and session handler component 119 can each include at least one processing unit, server, virtual server, circuit, engine, agent, appliance, or other logic device such as programmable logic arrays configured to communicate with the data repository 123 and with other computing devices (e.g., the client computing device 110, the content provider computing device 102, or the service provider computing device 104) via the at least one computer network 106. The network 106 can include computer networks such as the internet, local, wide, metro or other area networks, intranets, satellite networks, other computer networks such as voice or data mobile phone communication networks, and combinations thereof.

The network 106 can include or constitute a display network, e.g., a subset of information resources available on the internet that are associated with a content placement or search engine results system, or that are eligible to include third party content items as part of a content item placement campaign. The network 106 can be used by the data processing system 112 to access information resources such as web pages, web sites, domain names, or uniform resource locators that can be presented, output, rendered, or displayed by the client computing device 110. For example, via the network 106 a user of the client computing device 110 can access information or data provided by the content provider computing device 102 or the service provider computing device 104.

The network 106 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 106 can include a wireless link, such as an infrared channel or satellite band. The topology of the network 106 may include a bus, star, or ring network topology. The network 106 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 110, the content provider computing device 102, and the service provider computing device 104 can each include at least one logic device such as a computing device having a processor to communicate with each other or with the data processing system 112 via the network 106. The client computing device 110, the content provider computing device 102, and the service provider computing device 104 can each include at least one server, processor or memory, or a plurality of computation resources or servers located in at least one data center. The client computing device 110, the content provider computing device 102, and the service provider computing device 104 can each include at least one computing device such as a desktop computer, laptop, tablet, personal digital assistant, smartphone, portable computer, server, thin client computer, virtual server, or other computing device.

The client computing device 110 can include at least one sensor 128, at least one transducer 129, at least one audio driver 130, and at least one speaker 131. The sensor 128 can include a microphone or audio input sensor. The transducer 129 can convert the audio input into an electronic signal. The audio driver 130 can include a script or program executed by one or more processors of the client computing device 110 to control the sensor 128, the transducer 129 or the audio driver 130, among other components of the client computing device 110 to process audio input or provide audio output. The speaker 131 can transmit the audio output signal.

The client computing device 110 can be associated with an end user that enters voice queries as audio input into the client computing device 110 (via the sensor 128) and receives audio output in the form of a computer-generated voice that can be provided from the data processing system 112 (or the content provider computing device 102 or the service provider computing device 104) to the client computing device 110, output from the speaker 131. The computer-generated voice can include recordings from a real person or computer generated language.

The content provider computing device 102 can provide audio based content items for display by the client computing device 110 as an audio output content item. The content item can include an offer for a good or service, such as a voice based message that states: "Would you like me to order you a taxi?" For example, the content provider computing device 102 can include memory to store a series of audio content items that can be provided in response to a voice based query. The content provider computing device 102 can also provide audio based content items (or other content items) to the data processing system 112 where they can be stored in the data repository 123. The data processing system 112 can select the audio content items and provide (or instruct the content provider computing device 102 to provide) the audio content items to the client computing device 110. The audio based content items can be exclusively audio or can be combined with text, image, or video data.

The service provider computing device 104 can include at least one service provider natural language processor (NLP) component 132 and at least one service provider interface 133. The service provider NLP component 132 (or other components such as a direct action API of the service provider computing device 104) can engage with the client computing device 110 (via the data processing system 112 or bypassing the data processing system 112) to create a back-and-forth real-time voice or audio based conversation (e.g., a session) between the client computing device 110 and the service provider computing device 104. For example, the service provider interface 133 can receive or provide data messages to the direct action API 120 of the data processing system 112. The service provider computing device 104 and the content provider computing device 102 can be associated with the same entity. For example, the content provider computing device 102 can create, store, or make available content items for a car sharing service, and the service provider computing device 104 can establish a session with the client computing device 110 to arrange for a delivery of a taxi or car of the car share service to pick up the end user of the client computing device 110. The data processing system 112, via the direct action API 120, the NLP component 118 or other components can also establish the session with the client computing device, including or bypassing the service provider computing device 104, to arrange for example for a delivery of a taxi or car of the car share service.

The data repository 123 can include one or more local or distributed databases, and can include a database management system. The data repository 123 can include computer data storage or memory and can store one or more parameters 124, one or more policies 125, content data 126, or templates 127 among other data. The parameters 124, policies 125, and templates 127 can include information such as rules about a voice based session between the client computing device 110 and the data processing system 112 (or the service provider computing device 104). The content data 126 can include content items for audio output or associated metadata, as well as input audio messages that can be part of one or more communication sessions with the client computing device 110.

The system 100 can optimize processing of sequence dependent operations in a voice activated data packet (or other protocol) environment. For example, the data processing system 112 can include or be part of a voice activated assistant service, voice command device, intelligent personal assistant, knowledge navigator, event planning, or other assistant program. The data processing system 112 can provide one or more instances of audio output for display from the client computing device 110 to accomplish tasks related to this input audio signal. The tasks can include, for example, communicating with the service provider computing device 104 or other third party computing devices to make dinner reservations or purchase movie tickets. For example, an end user can enter an input audio signal into the client computing device 110 of: "OK, I would like to go to go dinner and then a movie tonight."

The sequence dependent operations can include a number of actions that occur in a known, suggested, required, or particular order. For example, going from home to a movie theater, then back home can include three sequence dependent operations or actions. The first action in this example includes travelling from home to the movie theater. The second action includes watching the movie in the theater. The third action includes returning home from the theater. In this example, the second action in the sequence (watching the movie) is subsequent to and dependent on the first action (going out to dinner), and the third action (returning home) is subsequent to and dependent on the first action and the second action. The third action can be considered subsequent to and dependent on the second action, as having expressed an intent to do so, the data processing system 112 predicts that the end user would watch the movie in the theater before returning home as well.

The data processing system 112 can include an application, script or program installed at the client computing device 110, such as an app to communicate input audio signals to the interface 117 of the data processing system 112 and to drive components of the client computing device to render output audio signals. The data processing system 112 can receive data packets or other signal that includes or identifies an audio input signal. For example, the data processing system 112 can execute or run the NLP component 118 to receive the audio input signal.

The NLP component 118 can convert the audio input signal into recognized text by comparing the input signal against a stored, representative set of audio waveforms (e.g., in the data repository 123) and choosing the closest matches. The representative waveforms are generated across a large set of users, and can be augmented with speech samples. After the audio signal is converted into recognized text, the NLP component 118 can match the text to words that are associated, for example via training across users or through manual specification, with actions that the data processing system 112 can serve.

The audio input signal can be detected by the sensor 128 (e.g., a microphone) of the client computing device. Via the transducer 129, the audio driver 130, or other components the client computing device 110 can provide the audio input signal to the data processing system 112 (e.g., via the network 106) where it can be received (e.g., by the interface 117) and provided to the NLP component 118 or stored in the data repository 123 as content data 126.

The NLP component 118 can obtain the input audio signal. From the input audio signal, the NLP component 118 can identify at least one request or at least one trigger keyword corresponding to the request. The request can indicate intent or subject matter of the input audio signal. The trigger keyword can indicate a type of action likely to be taken. For example, the NLP component 118 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The prediction component 115 (or other mechanism of the data processing system 112) can determine, based on the request or the trigger keyword, at least one thread associated with the input audio signal. The thread can indicate a set of sequence dependent operations, such as a series of actions. The thread can include any two or more actions, such as a first action, a second action, and a third action. For example, the input audio signal "OK, I would like to go to go dinner and then a movie tonight" can include at least one request indicating an interest to attend dinner and a movie, and at least one trigger keyword, e.g., "go" indicating a need for transportation. The prediction component 115 can identify a thread with at least three actions, such as a dinner action (first action), a movie action (second action), and a transportation home action (third action). In this example, from the request or the trigger keyword the prediction component 115 predicts, estimates, or otherwise determine the three actions. The thread can include other actions, such as an initial transport to dinner action.

The data processing system 112 or component thereof such as the prediction component 115 can determine that the actions of the thread are sequence dependent operations. For example, the prediction component can determine that the second action of watching the movie is subsequent to the first action of eating dinner, and that the third action of travelling home from the movie theater is after the second action of watching the movie. The prediction component 115 can access the parameters 124 or policies 125 in the data repository 123 to determine or otherwise estimate the order of the sequence dependent actions. For example, the parameters 124 or policies 125 could indicate that a transport action (e.g., a taxi home) can occur after an event action (e.g., watching a movie).

The content selector component 114 can obtain indications of any of the actions of the thread. For example, the prediction component 115 can directly or indirectly (e.g., via the data repository 123) provide an indication of the third (or any other) action to the content selector component 114. The content selector component 114 can obtain this information from the data repository 123, where it can be stored as part of the content data 126. The indication of the third action can inform the content selector component 114 of a need for transportation from the location of the movie theater to a location as determined or indicated by the client computing device 110, such as a ride to an end destination.

The prediction component 115 can generate presentation probability predictive models (also referred to as probability predictive models) as described herein. The probability predictive model can output the probability that a digital component is presented and then viewed by the user of a client computing device. The probability can be the that a predetermined portion of the digital component is presented to the user. The portion can be between about 50% and about 100%, between about 60% and about 100%, or between about 75% and about 100% of the digital component. A predetermined portion of the digital component may not be presented to the user after the digital component is transmitted to the client computing device because the user can terminate the presentation of the digital component. The predictive model can be based on prior date from the presentation of digital components to client computing device. The prior data can include viewability variables that can be based on characteristics of the client computing device (e.g., the device type (a mobile phone, a voice controlled assistant device, etc.) of the client computing device), characteristics of settings associated with the client computing device, or setting set by the user of the client computing device. The predictive model can be updated. As digital components are presented to additional client computing device, the data received from the presentation of the digital components can be incorporated into the probability predictive model.

The content selector component 114 can obtain indications of a later action in the thread prior to the occurrence of at least one earlier action. For example, the content selector component 114 can receive an indication of the third action (e.g., a need for a ride from the movie theater) before the movie plays in the theater (second action), or before the person who input the input audio signal into the client computing device 110 eats dinner at the restaurant (first action). The content selector component 114 can obtain indications of at least one action of the thread before completion of at least one action of the thread.

From the information received by the content selector component 114, e.g., an indication of the third action before occurrence of at least one prior action in the sequence dependent thread, the content selector component 114 can identify at least one content item. The content item can be responsive or related to the third action. For example, the content item can include an audio message offering services of a car share company, responsive to the third action that indicates a transportation need. The content selector component 114 can query the data repository 123 to select or otherwise identify the content item, e.g., from the content data 126. The content selector component 114 can also select the content item from the content provider computing device 102. For example, responsive to a query received from the data processing system 112, the content provider computing device 102 can provide a content item to the data processing system 112 (or component thereof) for eventual output by the client computing device 110.

The audio signal generator component 122 can generate or otherwise obtain an output signal that includes the content item responsive to the third action. For example, the data processing system 112 can execute the audio signal generator component to generate or create an output signal corresponding to the content item. The interface 117 of the data processing system 112 can provide transmit one or more data packets that include the output signal via the computer network 106 to the client computing device 110. The interface 117 can be designed, configured, constructed, or operational to receive and transmit information using, for example, data packets. The interface 117 can receive and transmit information using one or more protocols, such as a network protocol. The interface 117 can include a hardware interface, software interface, wired interface, or wireless interface. The interface 117 can facilitate translating or formatting data from one format to another format. For example, the interface 117 can include an application programming interface that includes definitions for communicating between various components, such as software components of the system 100.

For example, the data processing system 112 can provide the output signal from the data repository 123 or from the audio signal generator component 122 to the client computing device 110. The data processing system 112 can also instruct, via data packet transmissions, the content provider computing device 102 or the service provider computing device 104 to provide the output signal to the client computing device 110. The output signal can be obtained, generated, transformed to or transmitted as one or more data packets (or other communications protocol) from the data processing system 112 (or other computing device) to the client computing device 110.

In this example, the content selector component 114 skips to a later (e.g., third) action in a set of sequence dependent operations to select a content item for the third action prior to occurrence (and prior to an immediate need) for activity corresponding to the third action. By skipping to a later sequenced action, the data processing system 112 is not required to process information related to the first action or the second action to select content items for those actions. This reduces processor utilization, power consumption and bandwidth from data transmissions that would otherwise be associated with selecting a content item (for the first action) or a content item (for the second action) prior to selecting the content item for the third action.

The content selector component 114 can select the content item for the (subsequent or later) third action as part of a real-time content selection process. For example, the content item can be provided to the client computing device for transmission as audio output in a conversational manner in direct response to the input audio signal. The real-time content selection process to identify the content item and provide the content item to the client computing device 110 can occur within one minute or less from the time of the input audio signal and be considered real-time.

The output signal that corresponds to the content item, for example obtained or generated by the audio signal generator component 122 transmitted via the interface 117 and the computer network 106 to the client computing device 110, can cause the client computing device 110 to execute the audio driver 130 to drive the speaker 131 to generate an acoustic wave corresponding to the output signal. The acoustic wave can include words of or corresponding to the content item for the third action. The output signal that corresponds to the content item can also include non-audio content items that render on the client computing device 110 that is the source of the input audio signal or on a different client computing device 110 (e.g., a wearable device computing device) as text or image messages that can render without audio elements.

The acoustic wave can be output from the client computing device 110 before the occurrence of the first action or the second action. For example, the acoustic wave can include the audio output of "Would you like a taxi waiting for you after the movie?" In this example, the data processing system 112 obtains the input audio signal of, for example, "OK, I would like to go to go dinner and then a movie tonight." From this information, the NLP component 118 identifies at least one request or at least one trigger keyword, and the prediction component 115 uses the request(s) or trigger keyword(s) to identify at least one thread. The thread includes a series of sequence dependent actions, e.g., a first dinner action, a second movie action, and a third transport home action. The prediction component 115 can determine (e.g., with at least a threshold level of confidence such as 75% confident) that these actions will occur in sequential order, where the end user of the client computing device 110 will first eat dinner, then after dinner go to a movie, then after dinner take transportation home or away from the movie theater. The content selector component 114 can, for example, bypass processing associated with content item selection for the first action and the second action and instead first select a content item for the third action, e.g., a content item for a car share service to arrange for transport with a pick-up location of the movie theater. The data processing system 112 or component thereof such as the audio signal generator component 122 can provide the content item for the third action to the client computing device 110. The acoustic wave can be output from the client computing device 110 subsequent to the occurrence of the first action and before the occurrence of the second action, e.g., between prior actions in the thread.

The content item for the third item can render at least in part as an audio output from the client computing device 110 before the first action or the second action has occurred. For example, the output signal that includes the content item for the third action can render as a human or automated voice that states "Would you like a ride home from the movie theater?" The data processing system 112 can receive a response to the content item for the third action prior to occurrence of one, more than one, or all of the prior actions in the ordered sequence of actions. For example, the data processing system 112 can provide the content item for rendering and receive a response, e.g., via the interface 117, before the end user has gone to dinner or before the end user has watched the movie. The data processing system 112 can provide the output signal that includes the content item in direct or real-time response to the input audio signal of "OK, I would like to go to go dinner and then a movie tonight" so that the packet based data transmissions via the computer network 106 that are part of a communication session between the data processing system 112 and the client computing device 110 has the flow and feel of a real-time person to person conversation. This packet based data transmission communication session can also include the content provider computing device 102 or the service provider computing device 104.

The content selector component 114 can select content items provided in response to the third (or any non-first) action in the sequence dependent set of actions before selecting any content item for any prior action in the sequence. This avoids the need to process at least some of the data corresponding to the prior actions, which causes the third content item to be selected with a reduced number of processing operations than would occur if the content items were selected in an order that matches the order of the sequence of actions. Content items for the prior (e.g., first and second) actions may or may not be selected, for example after selection of the content item for the third action.

The content selector component 114 can select the content item (e.g., for the third action) based on at least one trigger keyword of the thread that indicates subject matter different than subject matter of the one or more requests of the same thread. For example, the requests of the thread responsive to "OK, I would like to go to go dinner and then a movie tonight" can indicate subject matter of a dinner request (first action), and subject matter of a movie request (second action). This subject matter does not indicate any transportation request. However, the NLP component 118 or the prediction component 115 (or other data processing system 112 components executing as part of the direct action API 120) can identify the trigger keyword "go" "go to" or "to go to" and can determine a transportation request (third action) based at least in part on the trigger keyword. Thus, the data processing system 112 can infer actions from the input audio signal that are secondary requests that are not the primary request or subject of the input audio signal.

The data processing system 112 can prevent or delay transmission of the output signal that includes the content item. For example, the interface 117 or a script executing via the direct action API 120 can prevent transmission of data packets that include the output signal corresponding to the content item until a triggering event. The triggering event can include expiration of a pre-determined time period, such as two hours or a time coinciding with occurrence of an earlier action in the thread, such as a scheduled end time of a movie. The triggering event can also include an authorization indication received by the data processing system 112 from the client computing device 110. The authorization indication can originate as a subsequent audio input associated with the thread but received by the data processing system subsequent to the input audio signal, a text-based or other non-audible signal, or can include an indication of a setting of the client computing device 110 that authorizes receipt by the client computing device 110 of content items.

The data processing system 112 can also delay transmission of the content item associated with a second or subsequent to second action of the thread to optimize processing utilization. For example, the data processing system 112 can delay content item transmission until an off-peak or non-peak period of data center usage, which results in more efficient utilization of the data center by reducing peak bandwidth usage, heat output or cooling requirements. The data processing system 112 can also initiate a conversion or other activity associated with the content item, such as ordering a car service, based on data center utilization rates or bandwidth metrics or requirements of the network 106 or of a data center that includes the data processing system 112.

The content items can correspond to the actions of the thread, and the content selector component 114 can select a content item for one, more than one, or all actions of the thread. The prediction component 115 can identify the sequence dependent thread of actions of, for example, "dinner" (first action) "movie" (second action) and "transport from movie location" (third action). The direct action API 120 can execute programs or scripts, for example from the NLP component 118, the prediction component 115, or the content selector component 114 to identify content items for one or more of these actions. The direct action API 120 can execute a specified action to satisfy the end user's intention, as determined by the data processing system 112. Depending on the action specified in its inputs, the direct action API 120 can execute code or a dialog script that identifies the parameters required to fulfill a user request. Such code can look up additional information, e.g., in the data repository 123, such as the name of a home automation service, or it can provide audio output for rendering at the client computing device 110 to ask the end user questions such as the intended destination of a requested taxi. The direct action API 120 can determine necessary parameters and can package the information into an action data structure, which can then be sent to another component such as the content selector component 114 or to the service provider computing device 104 to be fulfilled.

The direct action API 120 of the data processing system 112 can generate, based on the request or the trigger keyword, data structures for the actions of the thread. The action data structures can be generated responsive to the request. The action data structure can be included in the messages that are transmitted to or received by the service provider computing device 104. Based on the request parsed by the NLP component 118, the direct action API 120 can determine to which of a plurality of service provider computing devices 104 the message should be sent. For example, if an input audio signal includes "order a taxi," the NLP component 118 can identify the trigger word "order" and the request for a taxi. The direct action API 120 can package the request into an action data structure for transmission as a message to a service provider computing device 104 of a taxi service. The message can also be passed to the content selector component 114. The action data structure can include information for completing the request. In this example, the information can include a pick up location and a destination location. The direct action API 120 can retrieve a template 127 from the repository 123 to determine which fields to include in the action data structure. The direct action API 120 can retrieve content from the repository 123 to obtain information for the fields of the data structure. The direct action API 120 can populate the fields from the template with that information to generate the data structure. The direct action API 120 can also populate the fields with data from the input audio signal. The templates 127 can be standardized for categories of service providers or can be standardized for specific service providers. For example, ride sharing service providers can use the following standardized template 127 to create the data structure: {client_device_identifier; authentication_credentials; pick_up_location; destination_location; no_passengers; service_level}.

For example, the content item for the third action can be provided for rendering at the client computing device 110 as an audio response that states "Would you like a ride home from the movie theater?" in response to the audio input signal. Subsequent or prior to this rendering, the data processing system 112 can select or provide a content item, e.g., "the Italian restaurant downtown has an opening for 7 pm tonight?" for the first action (dinner), and can select or provide another content item, e.g., "would you like tickets to the 9 pm movie at the downtown theater?" for the second action (movie). The data processing system 112 can provide (which includes instructing the content provider computing device 102 to provide) these content items responsive to the input audio signal for rendering by the client computing device 110 as audio output content items. The data processing system 112, via the interface 117, can select or provide these content items in any order to the client computing device 110. For example, the content item for the third (e.g., last) action can be selected or provided first, before content items corresponding to other, earlier actions of the thread.

The data processing system 112 can receive a response to the content item "would you like a ride home from the movie theater?" The response can include an input audio signal, e.g., "yes please" that was entered into the client computing device 110 by the end user and received by the data processing system 112. Based on this response, the direct action API 120 can communicate with the service provider computing device 104 (that can be associated with the content item, such as a car share company) to order a taxi or ride share vehicle for the location of the movie theater at the time the movie ends. The data processing system 112 can obtain this location or time information as part of the data packet (or other protocol) based data message communication with the client computing device 110, from the data repository 123, or from other sources such as the service provider computing device 104 or the content provider computing device 102. Confirmation of this order (or other conversion) can be provided as an audio communication from the data processing system 112 to the client computing device 110 in the form of an output signal from the data processing system 112 that drives the client computing device 110 to render audio output such as, "great, you will have a car waiting for you at 11 pm outside the theater." The data processing system 112, via the direct action API 120, can communicate with the service provider computing device 104 to confirm the order for the car.

The data processing system 112 can obtain the response (e.g., "yes please") to the content item ("would you like a ride home from the movie theater?") and can route a packet based data message to the service provider NPL component 132 (or other component of the service provider computing device). This packet based data message can cause the service provider computing device 104 to effect a conversion, e.g., to make a car pick up reservation outside the movie theater. This conversion—or confirmed order—(or any other conversion of any other action of the thread) can occur prior to completion of one or more actions of the thread, such as prior to completion of the movie, as well as subsequent to completion of one or more actions of the thread, such as subsequent to dinner.

Based on a response to a content item for a subsequent action in the thread, such as the response "yes please" to the content item "would you like a ride home from the movie theater" for the third and last action in a sequence dependent thread, the data processing system 112 can initiate a conversion or action. This can occur before the end user has begun any activities associated with the thread, e.g., before dinner or before the movie is over. Processors of the data processing system 112 can invoke the direct action API 120 to execute scripts that order a car from a car share service. The direct action API 120 can obtain content data 126 (or parameters 124 or policies 125) from the data repository 123, as well as data received with end user consent from the client computing device 110 to determine location, time, user accounts, logistical or other information in order to reserve a car from the car share service. Using the direct action API 120, the data processing system 112 can also communicate with the service provider computing device 104 to complete the conversion by in this example making the car share pick up reservation.

The direct action API 120 can initiate the conversion or activity to accomplish an action of the thread at any time during a time period from receipt by the data processing system 112 of the first input audio signal associated with the thread, (e.g., "OK, I would like to go to go dinner and then a movie tonight") until a threshold time period subsequent to completion of one of the actions of the thread, (e.g., until 15 minutes after the end of the second action of watching the movie). The data processing system 112 can also determine the end of this time period based on other factors, such as an indication that the end user has completed the actions of the thread, e.g., has returned home or is no longer located at the movie theater. The data processing system 112 can also obtain an indication from the client computing device 110 (a data message transmitted via the network 106) that the thread is cancelled or dormant or that the end user has cancelled or completed actions of the thread.

The direct action API 120 can initiate the conversion or activity to accomplish an action of the thread based on completion or time of completion of other actions of the thread. For example, the data processing system 112 can order a good or service (car share pick-up) directly or by communicating with the service provider computing device 104 within a threshold time period of a conclusion of a prior action in the thread. Within 5 minutes (or other time period) prior or subsequent to the scheduled or actual conclusion of the movie (second action), the data processing system 112 can confirm or order a car share service to send a car to pick up the end user at the movie theater (subsequent, third action). This can occur in the absence of input received from the end user computing device 110 during this time period, or responsive to a prompt received from the end user computing device 110 during this time period.

The direct action API 120 can initiate the conversions or other activity associated with the sequence dependent operations of the thread in any order. For example, the direct action API 120 (or other data processing system 112 component) can initiate activity corresponding to a final action (e.g., the third action in a three action thread such as ordering a taxi) prior to initiating activity corresponding to an earlier thread in the sequence, (e.g., prior to making a dinner reservation or prior to ordering movie tickets). In this example, the data processing system 112 initiates activity for an earlier (e.g., second) action subsequent to initiation of activity for the later (e.g., third) action.

The content selector component 114 can identify, select, or obtain multiple content items resulting from a multiple content selection processes. The content selection processes can be real-time, e.g., part of the same conversation, communication session, or series of communications sessions between the data processing system 112 and the client computing device 110 that involve a thread. The conversation can include asynchronous communications separated from one another by a period of hours or days, for example. The conversation or communication session can last for a time period from receipt of the first input audio signal until an estimated or known conclusion of a final action of the thread, receipt by the data processing system 112 of an indication of a termination of the thread. This can be referred to as the active time period of the thread. For example, for a thread with three actions (e.g., dinner, move, and transport home), the content selector component 114 can select at least one content item for each action. The content item selector component 114 can run or obtain results from a different content selection process for each action. In the content selection processes the content provider computing device 110 can set forth content items for selection by the content selector component 114. For a thread with at least three actions, the content item selector component can select or otherwise identify a first content item for the first action via a first content selection process, a second content item for the second action via a second content selection process, and a third content item for the third action via a third content selection process. The data processing system 112 that provides these content items for rendering by the client computing device 110 during the active time period of the thread can be considered to be operating in real-time. In this example, the content selection processes and rendering of the content items occurs in real time.

The data processing system 112 can cancel actions associated with content items. For example, after ordering the car service the end user may watch the movie but then decide to walk home, or to have desert after the movie instead of taking a car home. An app or other program executing at the client computing device 110 as part of the data processing system 112 can receive an input audio signal of "cancel my ride home". The NLP component 118 can receive this input audio signal, for example as one or more packet based data messages, and can determine that this input audio signal relates to a pre-existing thread (e.g., dinner, movie, transport home) and is part of the same conversation or communication. For example, the NLP component 118 (or other data processing system 112 component) can evaluate time data, location data and pre-existing thread data such as past, present, or scheduled actions of a thread from the content data 126 of the data repository 123 to determine that an input audio signal relates to a pre-existing thread. Based, for example, on the request "ride" or the trigger keyword "cancel" the NLP component 118 can determine that the input audio signal "cancel my ride home" relates to the content item "would you like a ride home from the movie theater?" that corresponds to the third action of a pre-existing thread. The direct action API 120 (or other component) can cause the data processing system 112 to communicate via the interface 117 with the service provider computing device 104 to cancel the order for the taxi or car share service to have a car waiting for the end user outside the movie theater upon conclusion of the movie.

The NLP component 120 can receive the data packet or other protocol based message to cancel an action of the thread prior to or subsequent to completion of any action of the thread. The NLP component 120 can receive from the client computing device 110 (or obtain from the data repository 123) a data message (inbound audio signal) to cancel an action of the thread within a time interval triggered by an earlier action of the thread. For example, in a sequence dependent thread with three actions, dinner, movie, transport, the data processing system 112 can receive the transport cancellation data message within 5 minutes (or other time period) of the conclusion of the movie. The data processing system 112 can prompt for confirmation of a product or service related to an action of the thread. For example, during a time period between the first action and the second action (e.g., after dinner and before the movie) the data processing system 112 can transmit a data message to the client computing device 110 that, when rendered at the client computing device 110 outputs the audio or text message stating "just confirming that you still want a car waiting for you after the movie." The data processing system 112 can receive a response, e.g., "yes, confirmed" or "no, cancel the car". The direct action API 120 can execute scripts to process this information and can communicate with the service provider computing device 104 to indicate the confirmation or the cancellation.

Figure 2:
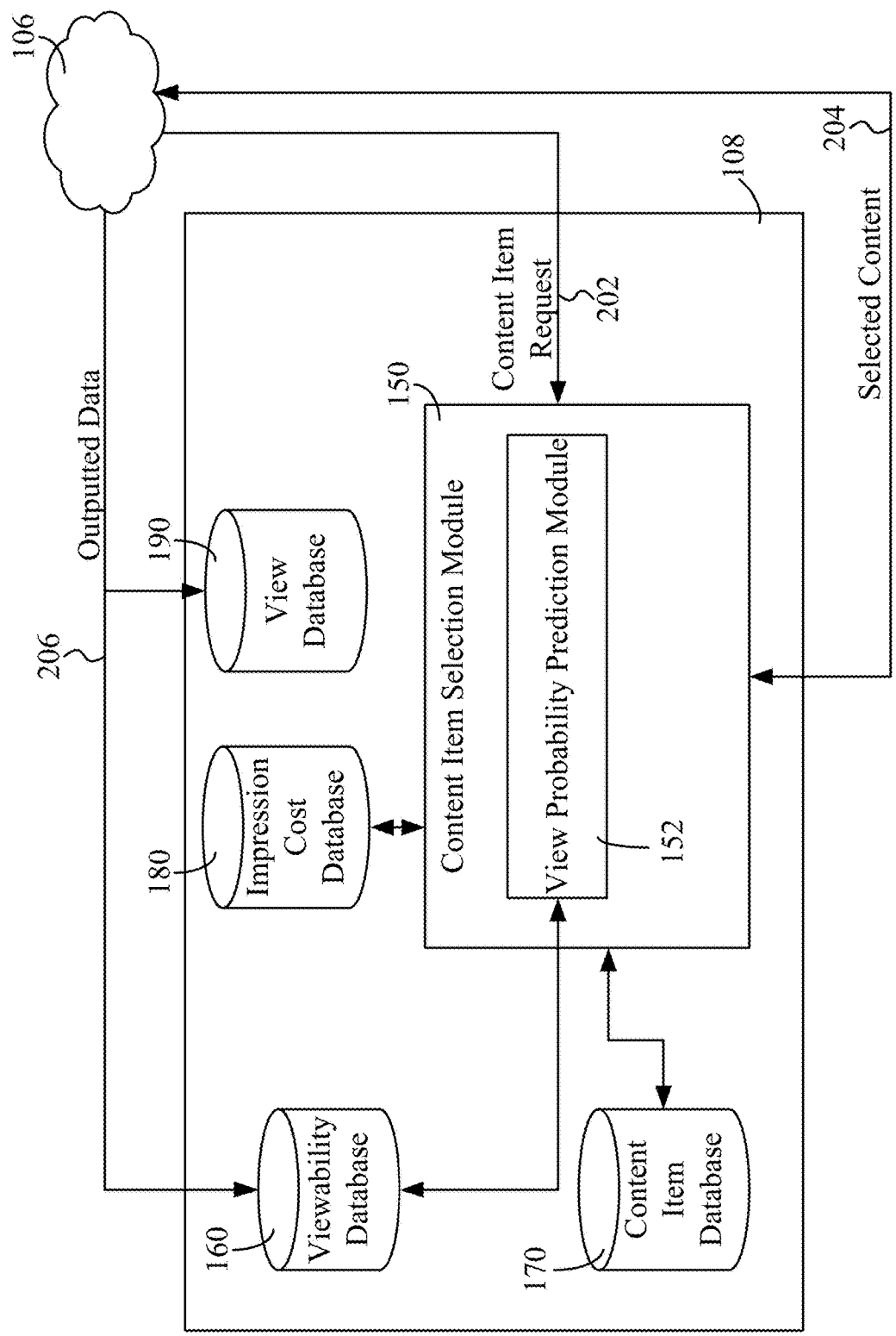
FIG. 2 is an overview depicting an example content item selection system.

Referring now to FIG. 2, portions of the content item selection system 108 are shown in more detail. In the present example, the content item selection system 108 includes a content item selection module 150, a viewability database 160, a content item database 170, an impression cost database 180, and a view database 190. The content item selection module 150 includes a view probability prediction module 152. While the present example depicts the viewability database 160, the content item database 170, the impression cost database 180, and the view database 190 as separate databases, it should be understood that the databases may be combined into a single database or sets of databases (e.g., the view database 190 may be a part of the viewability database 160).

The content item selection module 150 is configured to receive a content item request 202 via the network 106. A user device, such as client computing device 110 of FIG. 1A, or a resource server, such as service provider device 104, may send the content item request 202 to the content item selection system 108 via the network 106. The content item request 202 may include one or more current viewability variables. The one or more current viewability variables may be based on characteristics of the user device (e.g., a type of user device, a display type of a user device, dimensions of the display), characteristics of a web browser executed on the user device (e.g., a type of web browser), settings associated with the user device (e.g., a display resolution, whether third-party content item blocking services are implemented), settings associated with the web browser executed on the user device (e.g., a height of a web browser window, a width of a web browser window, a text size setting of the web browser of the user device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser, formulae derived from dimensions of a web browser window and/or location of an area where a content item may be shown), and/or characteristics of the resource with which the content item is to be presented (e.g., a position of the content item slot in the resource, a category of the resource, a type of the resource, an interactivity level of the resource, a ranking of the resource, a popularity of the resource, dimensions of an area where a content item may be shown, part or all of an address of the resource). In some implementations, the current viewability variables associated with the requesting device and/or the resource may be appended to a content item request URL (e.g., http://contentitem.item/page/contentitem?devid=abc123&devnfo=A34r0).

The current viewability variables for the content item request 202 are received by the view probability prediction module 152 and used with a view probability predictive model to output a view probability (e.g., a value between 0 and 1) that a served third-party content item will be viewed given the set of current viewability variables. The current viewability variables may be received with the content item request 202 (e.g., a script or function of the resource may output the current viewability variables as part of the content item request 202, such as appended to the content item request URL) or may be retrieved when the content item request 202 is initially received (e.g., by calling a script or function to output the current viewability variables). The received current viewability variables may be stored in the viewability database 160 and may be associated with a unique identifier, such as a unique identifier for the content item request 202. As will be discussed herein, the stored current viewability variables may be associated with data indicative of whether the served content item is viewed on a display of a device to update and refine a view probability predictive model.

In some implementations, the content item selection module 150 is also configured to retrieve or receive a view probability prediction model from the viewability database 160 for the view probability prediction module 152. The view probability prediction module 152 is configured to determine a view probability based on the view probability prediction model and the current viewability variables. That is, the view probability prediction module 152 inputs the current viewability variables into the view probability prediction model and generates a view probability as an output.

In some other implementations, the content item selection module 150 may be configured to retrieve or receive view data from the viewability database 160 for the view probability prediction module 152. The view data includes data about previously served content items that includes data indicative of whether each previously served content item was viewed and any viewability variables associated with the previously served content item. The view probability prediction module 152 may utilize the view data to generate the view probability prediction model.

For example, according to various implementations, the view probability prediction module 152 may generate the view probability predictive model using logistic regression based on the view data, as will be described in greater detail herein.

The output from the view probability predictive model is received by the content item selection module 150 and utilized with one or more bids associated with third party content items. For example, an estimated cost per mille viewable (eCPMV) may be calculated for each third-party content item by eCPMV=VP*CPMV, where VP is the view probability and CPMV is the cost per mille viewable (CPMV) bid associated with the third-party content item. The content item selection module 150 is configured to perform an auction to select a content item, as will be discussed in greater detail below.

An impression cost (IC) associated with the selected content item is determined by the content item selection module 150 and is stored in the impression cost database 180. In one example, the impression cost is stored in a record or log of the impression cost database 180. The impression cost may be associated with a unique identifier, such as a unique identifier for the content item request 202, such that the impression cost may be matched with data in the view database 190 if the selected content item is viewed, as will be described below. The impression cost may be determined by $$IC = \frac{eCPMV_{runner-up}}{1000 * VP},$$

where eCPMV runner-up is the next highest eCPMV value. The impression cost may be billed or charged to the service provider device only if the served content item is viewed, as will be described in greater detail herein.

The content item selection module 150 is configured to retrieve the selected content item from the content item database 170 to be sent in response to the content item request 202. The content item selection module 150 includes or associates a script with the selected content item. For example, the script may be a JavaScript® script that can be embedded in the data to effect presentation of the selected content item or the script may simply be associated with the selected content item and sent with the data to effect presentation of the selected content item. The script is configured to immediately output data 206 to indicate if the served content item is viewed on a display of a device, such as the client computing device 110. The data 206 may include only data indicating that the served content item is viewed on a display of a device or the data 206 may also include the current viewability variables or other data. In some instances, the data 206 may be associated with a unique identifier, such as that for the content item request 202. The determination of whether the served content item is viewed will be described in greater detail in reference to FIGS. 3 and 4. In some implementations, the script may be configured to directly determine whether the served content item is viewed. In other implementations, the script may receive input from another script that monitors a viewable region with respect to the displayed resource and served content item.

The outputted data 206 may be stored in a record or log of the view database 190 and/or the viewability database 160. In implementations where the data 206 includes the data indicative of whether the served content item is viewed on a display of a device, the data 206 may be stored in view database 160 and may also be matched with the corresponding viewability variables in the viewability database 160 (e.g., by matching the unique identifiers) and stored with the current viewability variables in the viewability database 160. The data 206 stored in the view database 190 may be matched (on-demand, periodically, etc.) with the stored impression costs in the impression cost database 180 to determine which served content items and associated impression costs were viewed. The matching of the data 206 can indicate whether the served content item was viewed on a display of a device and the stored impression costs may be utilized such that a service provider device is only billed or charged for served content items that were viewed, as will be described in greater detail herein. In some implementations, the impression cost database 180 and view database 190 may be part of another system and the content item selection system 108 may transmit the impression cost data and/or the data 206 to the other system.

Figure 3:
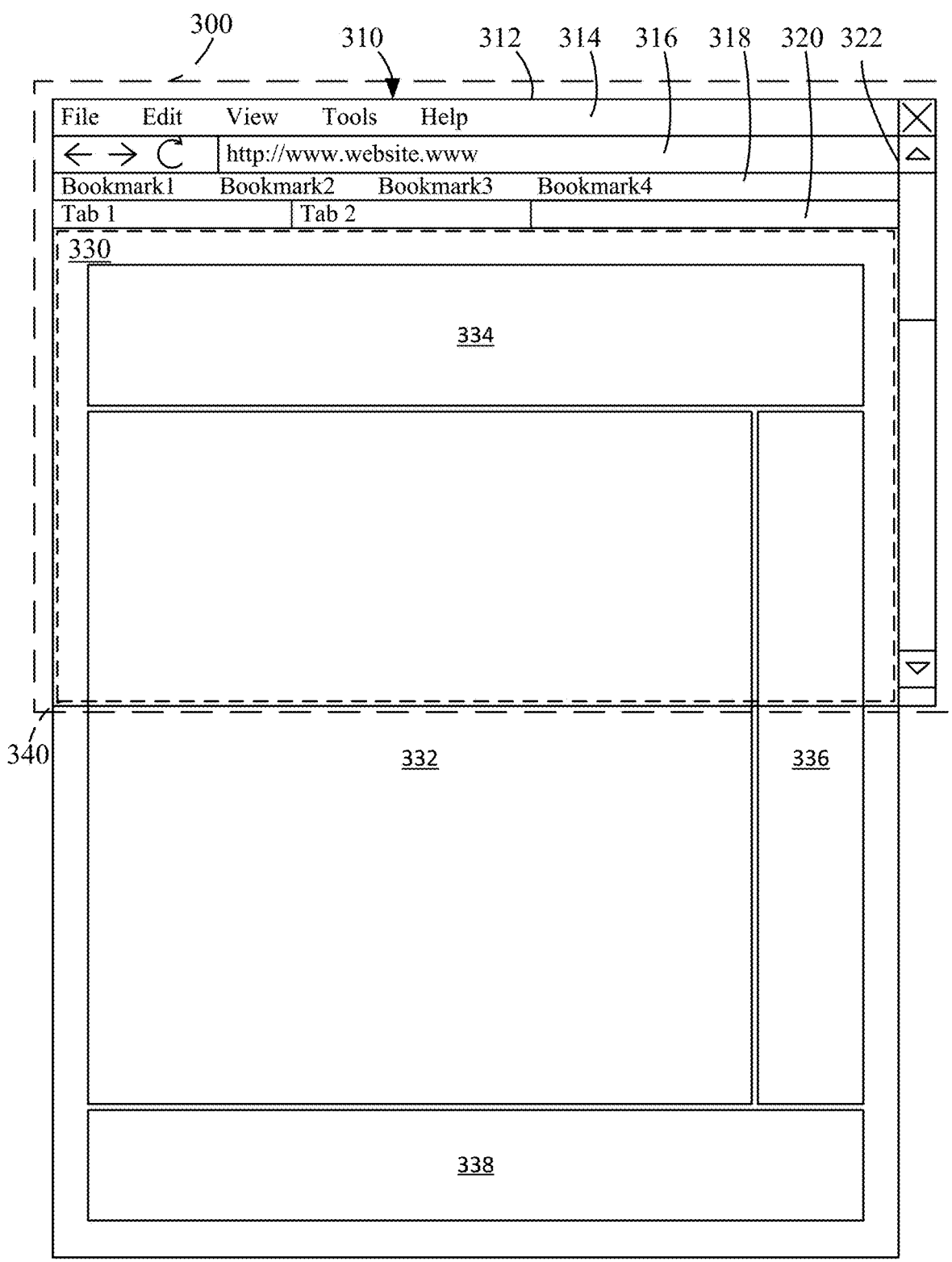
FIG. 3 is an overview depicting an example resource having several content item slots.

FIG. 3 depicts an example display 300 (shown in phantom) of a user device, such as client computing device 110 of FIG. 1A, with a web browser 310 for displaying resources on the display 300. The web browser 310 includes a window 312 having a dimensional height and dimensional width. The dimensional height and/or dimensional width of the window 312 for the web browser 310 may be adjusted by a user (e.g., by clicking and dragging to resize the window). The web browser 310 of the present example also includes a toolbar portion 314, a navigation and address portion 316, a bookmark portion 318, a tab portion 320, and a scroll bar 322. The web browser 310 may operate by receiving input of a URL in the address bar of the navigation and address portion 316, such as a web address, from an input device (e.g., a pointing device, a keyboard, a touch screen, or another form of input device). In response, one or more processors of a user device executing the instructions from the web browser 310 may request data from another device connected to a network, such as network 106, referred to by the URL address (e.g., a service provider device 104). The other device may then provide web page data and/or other data to the user device, which causes visual indicia to be displayed by the display of the user device. Accordingly, the web browser 310 displays a retrieved resource 330, such as a web page.

In the present example, the web browser 310 includes a viewable region 340 (shown in phantom) in which the resource 330 and/or portions thereof may be displayed. A variety of variables may affect the size of the viewable region 340. For example, the variables that may affect the size of the viewable region 340 may include characteristics of the user device (e.g., a type of user device, a display type of a user device, dimensions of the display), characteristics of the web browser 310 executed on the user device (e.g., a type of web browser), settings associated with the user device (e.g., a display resolution, whether third-party content item blocking services are implemented), and/or settings associated with the web browser 310 executed on the user device (e.g., the height of the window 312 of the web browser 310, the width of the window 312 of the web browser 310, a text size setting of the web browser 310, a font setting of the web browser 310, a zoom setting of the web browser 310, a dimension of one or more toolbar portions 314 of the web browser 310, a dimension of one or more navigation and address portions 316 of the web browser 310, a dimension of one or more bookmark portions 318 of the web browser 310, a dimension of one or more tab portions 320 of the web browser 310, a number of tabs open in the web browser 310, a dimension of a scroll bar 322 of the web browser 310). By way of example, a viewable region 340 may be large for a large display with a high display resolution, a large height and width for the window 312 of the web browser 310 with small dimensions for the toolbar portion 314, the navigation and address portion 316, the bookmark portion 318, the tab portion 320, and the scroll bar 322. Conversely, the viewable region 340 may be smaller for a small display with a low display resolution, a small height and width for the window 312 of the web browser 310 and large dimensions for several toolbar portions 314, the navigation and address portion 316, the bookmark portion 318, the tab portion 320, and the scroll bar 322. In some instances, one or more of the toolbar portion 314, the navigation and address portion 316, the bookmark portion 318, the tab portion 320, and the scroll bar 322 may be omitted. In addition, it should be understood that several toolbars may be installed on the user device for the toolbar portion 314.

An example resource 330 is shown displayed by the display 300 of the user device in the viewable region 340 of the web browser 310. The resource 330 includes a first party content portion 332, a first content item slot 334, a second content item slot 336, and a third content item slot 338. In the present example, the first content item slot 334 is shown completely within the viewable region 340 while the first party content portion 332 and the second content item slot 336 are partially shown in the viewable region 340. The third content item slot 338 is not shown within the viewable region 340.

The determination of whether a served content item is viewed may be based upon data indicating that at least a predetermined percentage of the pixels of the served content item are visible within the viewable region 340. The predetermined percentage may be from 0% of the pixels to 100% of the pixels, inclusive. For example, the predetermined percentage may be 5%, 10%, 15%, 20%, 25%, 30%, 35%, 40%, 45%, 50%, 55%, 60%, 65%, 70%, 75%, 80%, 85%, 90%, 95%, etc. In the present example, the predetermined percentage is 50%. In some implementations, the service provider device may select the predetermined percentage to be used. As shown in FIG. 3, a served content item in the first content item slot 334 may be determined to be viewed as 100% of the pixels of the served content item are within the viewable region 340. A content item served in the second content item slot 336 may be determined to not have been viewed yet as approximately 40% of the pixels of the served content item are within the viewable region 340. If, for example, the user utilizes the scroll bar 322 to scroll down the resource 330 such that at least 50% of the pixels are visible within the viewable region 340, then a determination may be made that a served content item in the second content item slot 336 has been viewed. A content item served in the third content item slot 338 may be determined to not have been viewed yet as none of the pixels of the served content item are within the viewable region 340. If, for example, the user utilizes the scroll bar 322 to scroll down the resource 330 such that at least 50% of the pixels of the served content item in the third content item slot 338 are visible within the viewable region 340, then a determination may be made that a served content item in the third content item slot 338 has been viewed.

As noted above in reference to FIG. 2, a script may be embedded or associated with the data to effect presentation of the served content items. The script may be configured to immediately output data to indicate if at least 50% of the pixels of the served content item are within the viewable region 340. In some implementations, the script may be configured to directly determine whether the served content item is viewed. In other implementations, the script may receive input from another script that monitors a viewable region 340 with respect to the displayed resource 330 and the served content item.

In some implementations, the determination that a served content item is viewed may also include a period of time for at least the predetermined percentage of the pixels of the served content item to be within the viewable region 340. For example, the period of time may be at least 0.5 seconds, 1 second, 2 seconds, 3 seconds, 4 seconds, 5 seconds, etc. In some implementations, the service provider device may select the period of time to be used. Thus, if a user rapidly scrolls past a served content item in a content item slot, then the content item may not be determined to have been viewed. For example, if 100% of the pixels of the served content item are within the viewable region 340 for 0.3 seconds and the period of time is 1 second, then the script or other script that sends input to the script associated with the served content item may determine that the served content item has not been viewed yet and data is not outputted to the content item selection system. In some implementations, the period of time may be a total period of time and not a contiguous period of time. Thus, if a served content item is viewed for a total amount of time greater than the period of time, even if not contiguous, then the served content item may be determined to have been viewed. For example, if a user scrolls past a served content item several times with periods of time that sum above the minimum period of time, then the script or other script that sends input to the script associated with the served content item may determine that the served content item has been viewed. In other implementations, the period of time may be a minimum contiguous period of time.

In some implementations, the determination of whether a served content item is viewed may be based upon data indicating that a measurement pixel (e.g., a pixel having a unique identifier or other data to identify the pixel) is within the viewable region 340. The measurement pixel may be associated with a logo of the served content item, a main image or subject of the served content item, text of the content item, a link of the content item, and/or other portions of the content item. In some instances, the measurement pixel may be positioned at a midpoint of the height and width of the served content item. In some implementations, a service provider device may select a pixel to be a measurement pixel to be used. In still further implementations, several measurement pixels may be utilized.

In yet other implementations, regions of several pixels of the served content item may be utilized to determine whether the served content item is viewed. For example, the pixels of a logo of the served content item may be the region of several pixels. Accordingly, if at least a predetermined percentage of the pixels of logo of the served content item are visible within the viewable region 340, then the script or other script that sends input to the script associated with the served content item may determine that the served content item has been viewed. The region of several pixels may be a region of pixels corresponding to a main image or subject of the served content item, text of the content item, a link of the content item, and/or any other region of pixels of the content item. In some implementations, a service provider device may select a region of pixels to be used. Of course, still further implementations to determine whether the served content item has been viewed relative to the viewable region 340 may be used as well.

The characteristics of the resource 330 with which a content item is to be presented in a content item slot 334, 336, 338 of the resource 330 may affect the probability that the select content item will be viewed. For example, a position of the content item slot 334, 336, 338 in the resource 330, a category of the resource 330, a type of the resource 330, an interactivity level of the resource 330, a ranking of the resource 330, a popularity of the resource 330, and/or other characteristics may affect the probability that a selected content item is viewed.

According to various implementations, data for the content of the resource 330 may be sent to the content item selection system 108 of FIGS. 1-2. The content of the resource 330 may be parsed for keyword terms to determine the category of the resource 330. For example, the content item selection system 108 may receive or extract keyword terms and determine a category for the resource 330 based on the keyword terms. In general, a category may be a set of words that convey the same or similar ideas. A word category may be a set of synonyms, according to one embodiment. For example, the text of the resource 330 may include the word "hotel." A word category that includes the word "hotel" may be as follows: category_1={inn, hotel, hostel, lodge, motel, public house, spa}

Such a category may be used to identify resources 330 devoted to the same topic, but use different terminology to do so.

In various implementations, the type of the resource 330 may be determined based on the parsed keyword terms. For example, a resource 330 containing keyword terms for news may indicate a news article. In other implementations, the type of the resource 330 may be determined based on a structure of the resource 330. For example, the resource 330 having a first party content portion 332 having a long vertical textual portion may correspond to an article type of resource 330. In other instances, a first party content portion 332 having several images may indicate and photo album type of resource 330. The type of the resource 330 may be useful for the view probability predictive model (e.g., an article type of resource may be more likely for a user to scroll through and read while a photo album may be quickly viewed and navigated away from).

The content item selection system 108 may also determine an interactivity level of the resource 330 based on the content of the resource 330. For example, a resource 330 having a web based game may be more interactive than a simple text resource 330. The content item selection system 108 may determine the interactivity level based on the data of the resource 330 (e.g., a JavaScript® file for a game or simple text).

The ranking and/or the popularity of a resource 330 may be retrieved from a metrics database or service. In some implementations, the ranking and/or popularity may be based on the traffic a resource receives over a period of time, such as traffic over the past hour, day, week, month, years, etc.

The position of the content item slot 334, 336, 338 in the resource 330, the category of the resource 330, the type of the resource 330, the interactivity level of the resource 330, the ranking of the resource 330, the popularity of the resource 330, and/or other characteristics of the resource 330 may be used as viewability variables for the view probability predictive model described herein.

Figure 4:
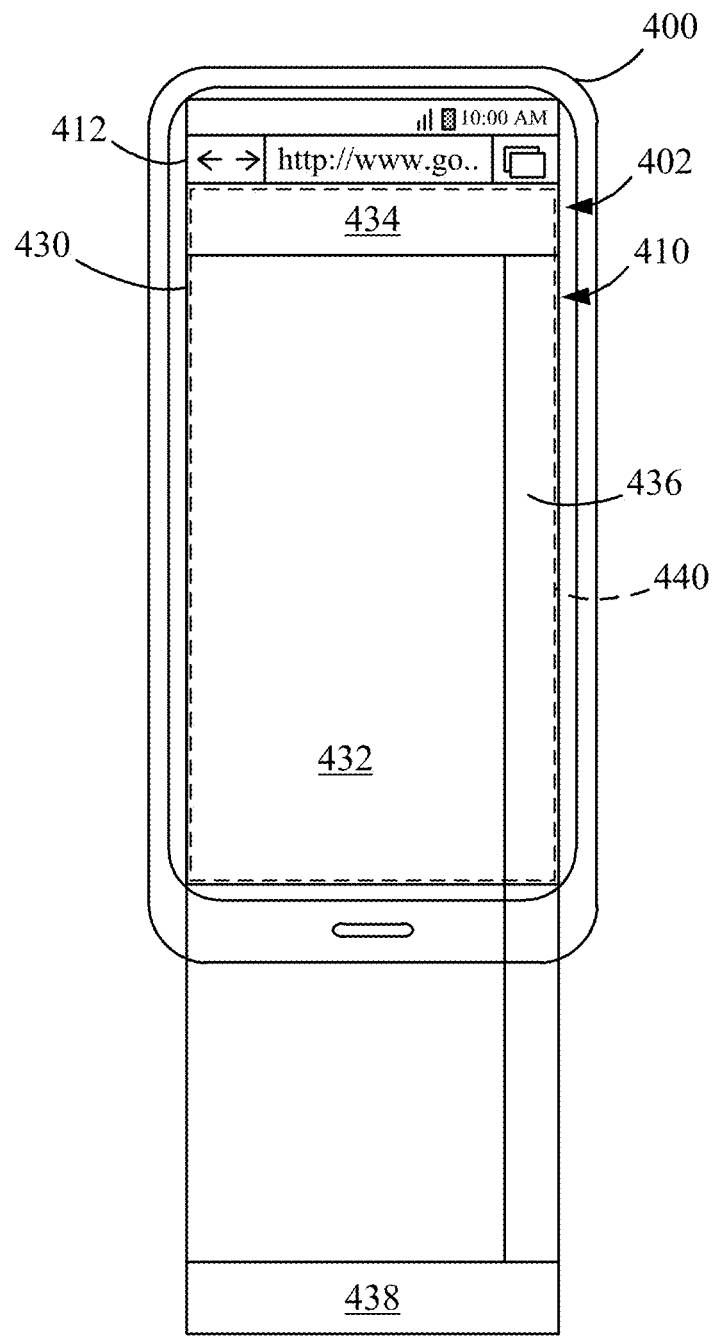
FIG. 4 is an overview depicting another example resource on a mobile user device having several content item slots.

FIG. 4 depicts a mobile user device 400, such as a smartphone, on which a resource 430 may be displayed by a display 402 of the user device. The user device 400 may utilize a web browser 410 for displaying resources on the display 402 of the user device 400. The web browser 410 of the present example includes a navigation and address portion 412 only, though it should be understood that a toolbar portion, a bookmark portion, a tab portion, and/or a scroll bar may also be included. The web browser 410 may operate by receiving input of a URL in the address bar of the navigation and address portion 412, such as a web address, from an input device, such as a keyboard displayed on the touch screen in the present example. In response, one or more processors of the user device 400 executing the instructions from the web browser 410 may request data from another device connected to a network, such as network 106, referred to by the URL address (e.g., a service provider device 104). The other device may then provide web page data and/or other data to the user device 400, which causes visual indicia to be displayed by the display 402 of the user device 400. Accordingly, the web browser 410 displays a retrieved resource 430, such as a web page.

The web browser 410 includes a viewable region 440 (shown in phantom) in which the resource 430 and/or portions thereof may be displayed. A variety of variables may affect the size of the viewable region 440. For example, the variables that may affect the size of the viewable region 340 may include characteristics of the user device 400 (e.g., a type of user device, a display type of a user device, dimensions of the display), characteristics of the web browser 410 executed on the user device (e.g., a type of web browser), settings associated with the user device 400 (e.g., a display resolution, whether third-party content item blocking services are implemented), and/or settings associated with the web browser 410 executed on the user device (e.g., the height of the web browser 410, the width of the web browser 410, a text size setting of the web browser 410, a font setting of the web browser 410, a zoom setting of the web browser 410, a dimension of one or more toolbar portions of the web browser 410, a dimension of one or more navigation and address portions 412 of the web browser 410, a dimension of one or more bookmark portions of the web browser 410, a dimension of one or more tab portions of the web browser 410, a number of tabs open in the web browser 410, a dimension of a scroll bar of the web browser 410). By way of example, a viewable region 440 may be large for a large display with a high display resolution and a web browser 410 with a small dimension for the navigation and address portion 412. Conversely, the viewable region 440 may be smaller for a small display with a low display resolution and a web browser 410 with a large dimension for the navigation and address portion 412.

An example resource 430 is shown displayed by the display 402 of the user device 400 in the viewable region 440 of the web browser 410. The resource 430 includes a first party content portion 432, a first content item slot 434, a second content item slot 436, and a third content item slot 438. In the present example, the first content item slot 434 is shown completely within the viewable region 440 while the first party content portion 432 and the second content item slot 436 are partially shown in the viewable region 440. The third content item slot 438 is not shown within the viewable region 440.

The determination of whether a served content item is viewed may be based upon data indicating that at least a predetermined percentage of the pixels of the served content item are visible within the viewable region 440. The predetermined percentage may be from 0% of the pixels to 100% of the pixels, inclusive. For example, the predetermined percentage may be 5%, 10%, 15%, 20%, 25%, 30%, 35%, 40%, 45%, 50%, 55%, 60%, 65%, 70%, 75%, 80%, 85%, 90%, 95%, etc. In the present example, the predetermined percentage is 50%. In some implementations, the service provider device may select the predetermined percentage to be used. As shown in FIG. 4, a served content item in the first content item slot 434 may be determined to be viewed as 100% of the pixels of the served content item are within the viewable region 440. A content item served in the second content item slot 436 may also be determined to be viewed as approximately 60% of the pixels of the served content item are within the viewable region 440. A content item served in the third content item slot 438 may be determined to not have been viewed yet as none of the pixels of the served content item are within the viewable region 440. If, for example, the user scrolls along the resource 430, such as by using a finger to scroll using a touch screen of the user device 400, such that at least 50% of the pixels of the served content item in the third content item slot 438 are visible within the viewable region 440, then a determination may be made that a served content item in the third content item slot 438 has been viewed.

As noted above in reference to FIG. 2, a script may be embedded or associated with the data to effect presentation of the served content items. The script may be configured to immediately output data to indicate if at least 50% of the pixels of the served content item are within the viewable region 440. In some implementations, the script may be configured to directly determine whether the served content item is viewed. In other implementations, the script may receive input from another script that monitors a viewable region 440 with respect to the displayed resource 430 and the served content item.

Of course, any of the implementations described above in reference to FIG. 3 may be utilized with the user device 400 and resource 430 of FIG. 4.

Figure 5:
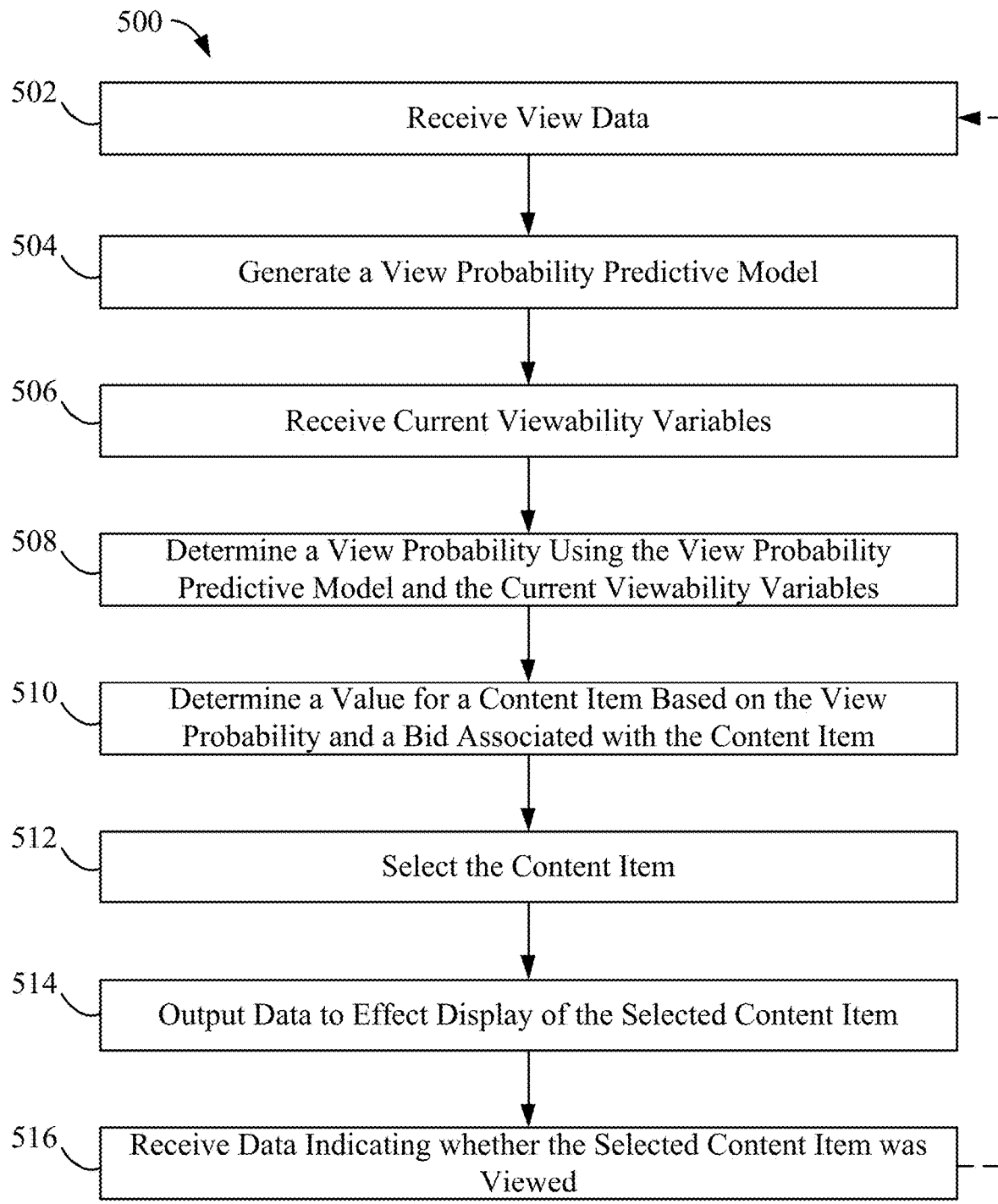
FIG. 5 is a flow diagram of an example process for generating a view probability predictive model based on view data and selecting and serving content items based on a view probability.

FIG. 5 depicts a flow diagram of an example process 500 for generating a view probability predictive model based on view data and selecting and serving content items based on a view probability. The content item selection system 108 may receive view data (ACT 502) from the viewability database 160. The view data includes data about previously served content items that includes data indicative of whether each previously served content item was viewed and any viewability variables associated with the previously served content item. The viewability variables may be based on characteristics of the user device (e.g., a type of user device, a display type of a user device, dimensions of the display), characteristics of a web browser executed on the user device (e.g., a type of web browser), settings associated with the user device (e.g., a display resolution, whether third-party content item blocking services are implemented), settings associated with the web browser executed on the user device (e.g., a height of a web browser window, a width of a web browser window, a text size setting of the web browser of the user device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser), and/or characteristics of the resource with which the content item is to be presented (e.g., a position of the content item slot in the resource, a category of the resource, a type of the resource, an interactivity level of the resource, a ranking of the resource, a popularity of the resource).

The content item selection system 108 may generate a view probability predictive model based on the received view data (ACT 504). In some implementations, the content item selection system 108 may generate the view probability predictive model. In other implementations, the view probability prediction module 152 of the content item selection system 108 may be utilized to generate the view probability prediction model. According to various implementations, the view probability prediction module 152 may generate the view probability predictive model using logistic regression based on the received view data. For example, according to various implementations, the view probability prediction module 152 may generate the view probability predictive model using logistic regression based on the view data. A logistic regression function may be defined as $$f(z) = \frac{1}{1+e^{-z}}.$$

The output, f(z), of the view probability predictive model represents the view probability (e.g., a value between 0 and 1) that a served third-party content item will be viewed given a set of viewability variables. The viewability variables of the received view data may correspond to inputs x1 through xk for the equation $z=\beta_0+\beta_1 x_1+\beta_2 x_2+\ldots+\beta_k x_k$ that is input into the logistic regression function. $\beta 0$ is the y-axis intercept, xi is an input variable affecting the probability outcome, and $\beta 1$ through $\beta k$ are regression coefficients or weights (e.g., determining how much each variable xi affects the outcome). Variable coefficients $\beta 1$, $\beta 2$, etc. are used to weigh the importance of each input variable according to its overall effect on probability output. A large regression coefficient means that the variable strongly influences the probability of that outcome, while a near-zero regression coefficient means that that variable has little influence on the probability of that outcome. In some implementations, the inputs to the model may be cross products of input values.

Training of the logistic regression model may be achieved by utilizing a corpus of known results from the received view data, such as the data indicative of whether each previously served content item was viewed, along with the corresponding viewability variables. According to some implementations, a comparison between the outputted view probability and the known results will provide a measurement of error that can be used to adjust the regression coefficients or weights $\beta 1-\beta k$, to minimize the error. The training may utilize additional data indicative of whether each previously served content item was viewed and the corresponding viewability variables such that the logistic regression model is continually updated to increase the accuracy of the model, as will be described in greater detail herein. Of course, other regression models may be used to generate the view probability predictive model, such as linear regression, naïve Bayesian, Bayesian linear regression, nonparametric regression, etc. In some implementations, an artificial neural network can be trained using the corpus of known results and the corresponding viewability variables.

The content item selection system 108 receives a set of current viewability variables (ACT 506). The set of current viewability variables may be based on characteristics of the user device (e.g., a type of user device, a display type of a user device, dimensions of the display), characteristics of a web browser executed on the user device (e.g., a type of web browser), settings associated with the user device (e.g., a display resolution, whether third-party content item blocking services are implemented), settings associated with the web browser executed on the user device (e.g., a height of a web browser window, a width of a web browser window, a text size setting of the web browser of the user device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser), and/or characteristics of the resource with which the content item is to be presented (e.g., a position of the content item slot in the resource, a category of the resource, a type of the resource, an interactivity level of the resource, a ranking of the resource, a popularity of the resource).

The set of current viewability variables may be associated with a received content item request, such as content item request 202 of FIG. 2. For example, the set of current viewability variables may be output by a script, such as a JavaScript®, of a resource or output in response to a request to a web browser executed on the user device. In some implementations, the set of current viewability variables may be appended to a content item request URL (e.g., http://contentitem.item/page/contentitem?devid=abc123&devnfo=A34r0).

According to some implementations, the set of current viewability variables may be retrieved after the content item request is initially received (e.g., by calling a script or function to output a set of current viewability variables in response to receiving the content item request).

The received set of current viewability variables may be stored in the viewability database 160 and may be associated with a unique identifier, such as a unique identifier for the content item request. As will be discussed herein, the stored set of current viewability variables may be associated with data indicative of whether the served content item is viewed on a display of a device to update and refine the view probability predictive model, according to some implementations.

The content item selection system 108 determines a view probability (e.g., a value between 0 and 1) using the received set of current viewability variables and the generated view probability predictive model (ACT 508). The set of current viewability variables are input into the view probability predictive model for corresponding inputs x1 through xk. In some implementations, if the set of current viewability variables omits a variable for an input of the view probability predictive model, a default value may be input. The default value may be an average value for that variable base on the received view data (ACT 502). In other implementations, the default value may be a zero value.

The content item selection system 108 determines a value for a content item based on the view probability and a bid associated with the content item (ACT 510). For example, the content item selection system 108 may determine a value, such as an eCPMV, for each third-party content item using the equation eCPMV=VP*CPMV, where VP is the determined view probability and CPMV is the CPMV bid associated with the third-party content item. The content item selection system 108 may determine values for several content items based on the determined view probability and the corresponding CPMV bid. In some implementations, the content item selection system 108 may rank the third-party content items based on the determined eCPMV values prior to performing an auction. That is, the third-party content items having bids based on whether a content item is viewed may be ranked based on the determined eCPMV values.

The content item selection system 108 selects a content item (ACT 512). The content item may be selected based on an auction performed by the content item selection system 108. The content item auction includes receiving service provider device submitted bids for the ability to provide content items for display with a resource presented on a display of a user device. The auction may include content items and associated bids based on whether a user clicks on the third-party content item, whether a user performs a specific action based on the presentation of the third-party content item, whether the third-party content item is selected and served, whether the third-party content item is viewed, and/or other types of bids. Values other than the value determined for a content item based on the view probability and a bid associated with the content item (ACT 510) may be determined for the other types of content items and associated bids. The content item selection system 108 selects the content item having an associated value that is the highest of the several values in the auction. By way of example, an auction may be between a content item having a bid based on whether the content item is viewed and a content item having a bid based on whether the content item is clicked. A determined view probability may be high, such as 0.8 (80%) while a predicted click-through-rate may be low, such as 0.05 (5%). If, for example, the bid based on whether the content item is viewed is high, such as $1.00, then the resulting determined value may be high, such as $0.80=0.8*$1.00. If the bid based on whether the content item is clicked is low, such as $5.00, then the resulting determined value may be low, such as $0.25=0.05*$5.00. Accordingly, the content item selection system 108 selects the content item having the bid based on whether the content item is viewed. Of course, the foregoing is merely an example.

The content item selection system 108 outputs data to effect display of the selected content item (ACT 514). The content item selection system 108 includes or associates a script with the selected content item. For example, the script may be a JavaScript® script that can be embedded in the data to effect presentation of the selected content item or the script may simply be associated with the selected content item and sent with the data to effect presentation of the selected content item. The script is configured to immediately output data to indicate if the served content item is viewed on a display of a device. The data may include only data indicating that the served content item is viewed on a display of a device or the data may also include the current viewability variables or other data. In some instances, the data may be associated with a unique identifier, such as that for the content item request. In some implementations, the script may be configured to directly determine whether the served content item is viewed. In other implementations, the script may receive input from another script that monitors a viewable region with respect to the displayed resource and served content item.

The script or the other script that monitors the viewable region may determine whether the served content item is viewed based on data indicating that at least a predetermined percentage of the pixels of the served content item is visible within a viewable region of the device to which the data to effect display of the selected content item is outputted, such as that described above in reference to FIG. 3. In some implementations, the predetermined percentage of the pixels may be from 0% to 100%, inclusive. The predetermined percentage may be, for example 50% of the pixels. In some implementations, the determination that the served content item is viewed may also include a period of time for at least the predetermined percentage of the pixels of the served content item to be within the viewable region, such as that described above in reference to FIG. 3. For example, period of time may be at least 0.5 seconds, 1 second, 2 seconds, 3 seconds, 4 seconds, 5 seconds, etc. In one example, the period of time may be 1 second. In some implementations, the determination of whether the served content item is viewed may be based upon data indicating that a measurement pixel is within the viewable region, such as that described above in reference to FIG. 3. In some instances, several measurement pixels may be utilized. In yet other implementations, regions of several pixels of the served content item may be utilized to determine whether the served content item is viewed, such as that described above in reference to FIG. 3. Of course, still further implementations to determine whether the served content item has been viewed relative to the viewable region may be used as well.

The content item selection system 108 receives the data indicating whether the selected content item was viewed (ACT 516). In some instances, the received data may be the data outputted by the script indicating that the served content item was viewed. In other instances, the content item selection system 108 may receive data indicating that the served content item was not viewed. For example, the content item selection system 108 may receive data or determine that the served content item was not viewed if a predetermined period of time elapses without receiving data indicating that the content item was viewed from the script associated with the served content item. The predetermined period of time may be, for example, one hour, two hours, three hours, four hours, eight hours, 24 hours, a week, etc.

In some implementations, the data indicating whether the content item was viewed may be matched with the stored current viewability variables in the viewability database 160 with other data indicating whether other content items were viewed or not and the viewability variables associated corresponding thereto. The data indicating that the content item was viewed may be matched with the stored current viewability variables based on the unique identifier associated with the data indicating that the content item was viewed received from the script and the unique identifier associated with the stored current viewability variables. As indicated with the dashed line, the data indicating whether the content item was viewed and the stored current viewability variables stored in the viewability database 160 may be included in a subsequent set of view data received by the content item selection system 108 to update and refine the generated view probability predictive model.

Figure 6:
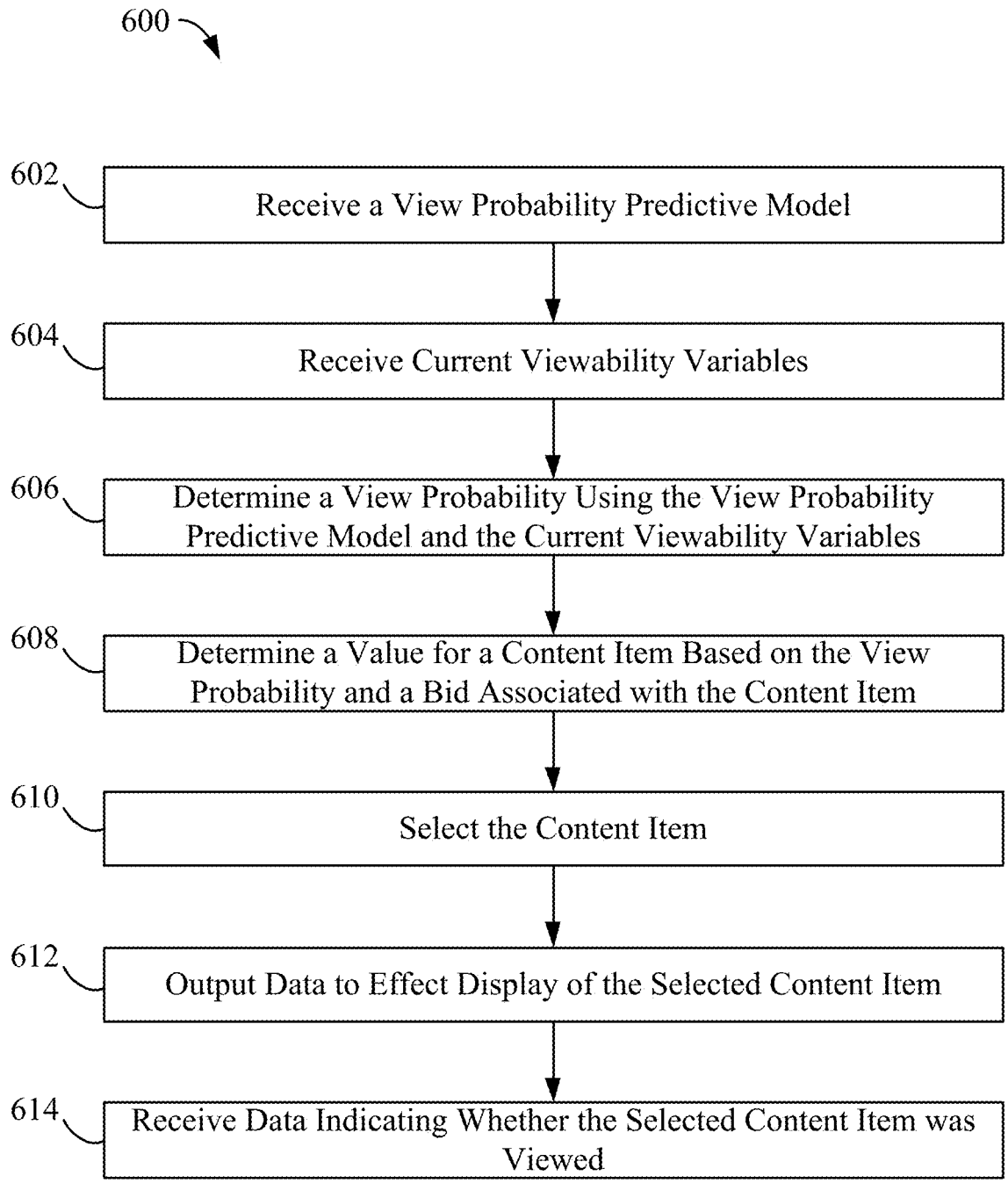
FIG. 6 is a flow diagram of an example process for selecting and serving content items based on a view probability from a received view probability predictive model.

FIG. 6 depicts a flow diagram of an example process 600 for selecting and serving content items based on a view probability from a received view probability predictive model. The content item selection system 108 may receive a view probability predictive model (ACT 602). In some instances, the view probability predictive model may be generated offline and stored in the viewability database 160 to be retrieved by the content item selection system 108. In some implementations, the view probability predictive model may be updated on a periodic basis (e.g., per hour, per day, per week, per 1,000,000 served content items, etc.).

Accordingly, the content item selection system 108 may utilize another computing system to update the view probability predictive model on a less frequent basis (thereby consuming less processing power).

The content item selection system 108 receives a set of current viewability variables (ACT 604). The set of current viewability variables may be based on characteristics of the user device (e.g., a type of user device, a display type of a user device, dimensions of the display), characteristics of a web browser executed on the user device (e.g., a type of web browser), settings associated with the user device (e.g., a display resolution, whether third-party content item blocking services are implemented), settings associated with the web browser executed on the user device (e.g., a height of a web browser window, a width of a web browser window, a text size setting of the web browser of the user device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser), and/or characteristics of the resource with which the content item is to be presented (e.g., a position of the content item slot in the resource, a category of the resource, a type of the resource, an interactivity level of the resource, a ranking of the resource, a popularity of the resource).

The content item selection system 108 determines a view probability (e.g., a value between 0 and 1) using the received set of current viewability variables and the received view probability predictive model (ACT 606). The content item selection system 108 determines a value for a content item based on the view probability and a bid associated with the content item (ACT 608). The content item selection system 108 selects a content item (ACT 610). The content item selection system 108 outputs data to effect display of the selected content item (ACT 612). The content item selection system 108 includes or associates a script with the selected content item. The content item selection system 108 receives the data indicating whether the selected content item was viewed (ACT 614). Steps 604, 606, 608, 610, 612, and 614 may be performed similarly to steps 506, 508, 510, 512, 514, and 516 of FIG. 5.

Figure 7:
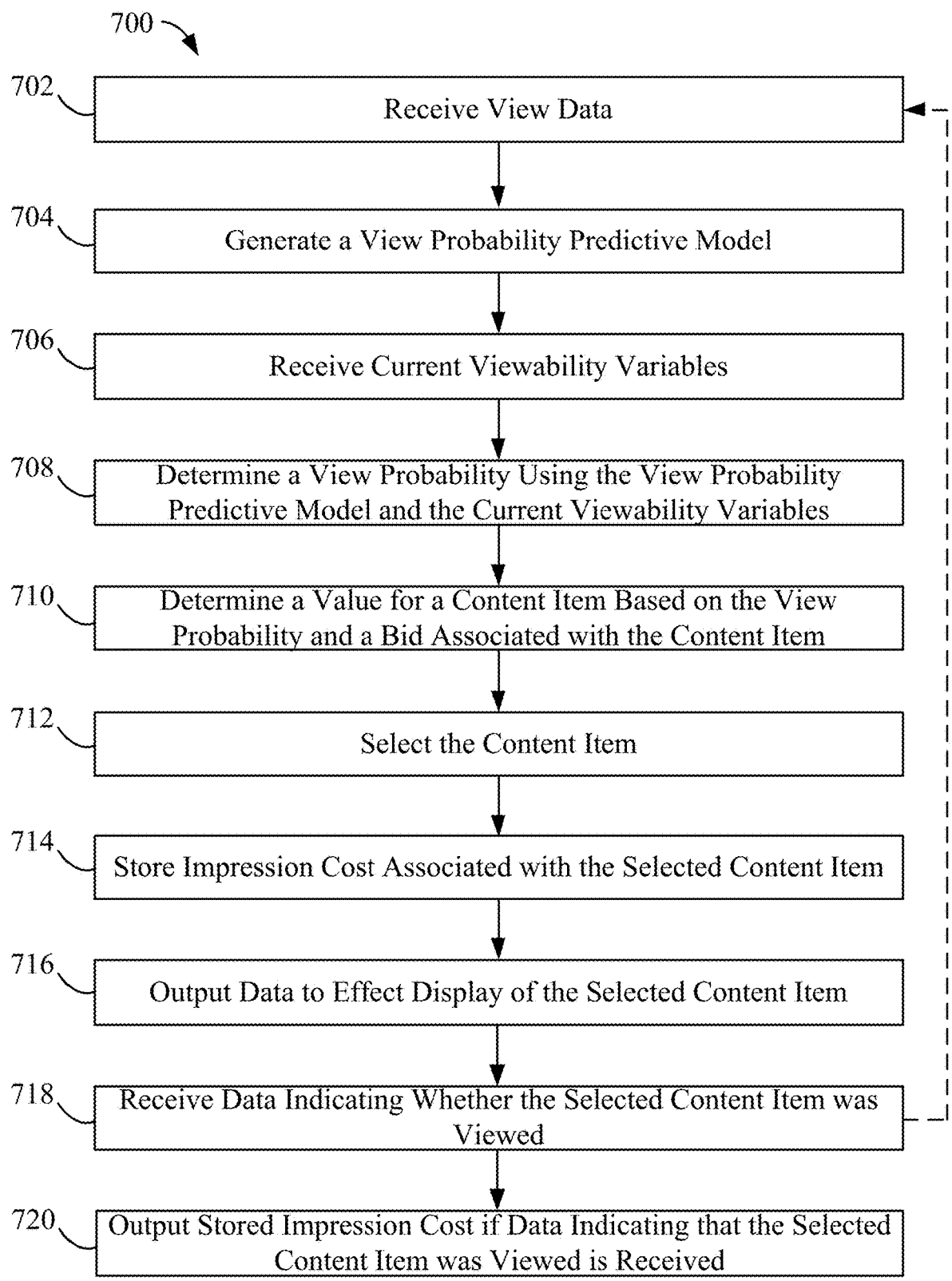
FIG. 7 is another flow diagram of another example process for selecting and serving content items based on a view probability and outputting an impression cost if data received by the content item selection system indicates that the selected content item was viewed.

FIG. 7 depicts an example process 700 for selecting and serving content items based on a view probability and outputting an impression cost if data received by the content item selection system indicates that the selected content item was viewed. The content item selection system 108 may receive view data (ACT 702) from the viewability database 160 and may generate a view probability predictive model based on the received view data (ACT 704). The content item selection system 108 receives a set of current viewability variables (ACT 706) and determines a view probability (e.g., a value between 0 and 1) using the received set of current viewability variables and the generated view probability predictive model (ACT 708). The content item selection system 108 determines a value for a content item based on the view probability and a bid associated with the content item (ACT 710) and selects a content item (ACT 712). Steps 702, 704, 706, 708, 710, and 712 may be performed similarly to steps 502, 504, 506, 508, 510, and 512 of FIG. 5.

In the present example, the content item selection system 108 may store an impression cost associated with the selected content item (ACT 714). The impression cost (IC) associated with the selected content item may be stored in the impression cost database 180. In one example, the impression cost is stored in a record or log of the impression cost database 180. The impression cost may be associated with a unique identifier, such as a unique identifier for the content item request, such that the impression cost may be matched with data in the view database 190 if the selected content item is viewed. The impression cost may be determined by $$IC = \frac{eCPMV_{runner-up}}{1000 * VP},$$

where eCPMV runner-up is the next highest value for another content item in the auction in which the content item is selected. As will be described below, the impression cost may be billed or charged to the service provider device only if the served content item is viewed.

The content item selection system 108 outputs data to effect display of the selected content item (ACT 716), including a script that is included or associated with data to effect display of the selected content item. Step 716 may be performed similarly to step 514 of FIG. 5. The content item selection system 108 receives the data indicating whether the selected content item was viewed (ACT 718). Step 718 may be performed similarly to step 516 of FIG. 5. In addition, if the content item selection system receives data indicating that the served content item was viewed, then the data may also be stored in the view database 190. In some instances, the data indicating that the served content item was viewed is associated with a unique identifier. The content item selection system 108 may match the data indicating that the served content item was viewed stored in the view database 190 with the stored impression cost stored in the impression cost database 180. The impression cost may be outputted if the content item selection system 108 determines that there is matching data indicating that the served content item was viewed stored in the view database 190. The impression cost may be outputted to a billing system such that a service provider device is only billed the impression cost if the received data indicates that the served content item was viewed.

Figure 8A:
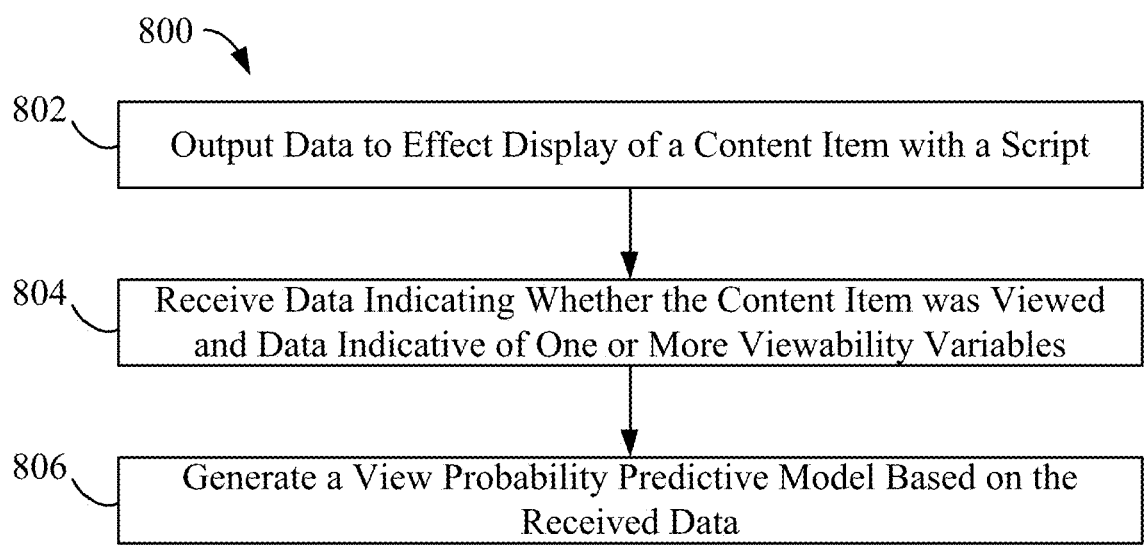
FIG. 8A is another flow diagram of an example process for generating a view probability predictive model using a script associated with a served content item.

FIG. 8A depicts an example process 800 for generating a view probability predictive model using a script associated with a served content item. The content item selection system 108 outputs data to effect display of a content item with a script (ACT 802). For example, the script may be a JavaScript® script that can be embedded in the data to effect presentation of the content item or the script may simply be associated with the content item and sent with the data to effect presentation of the content item. The script is configured to immediately output data to indicate if the content item is viewed on a display of a device. The data may include only data indicating that the content item is viewed on a display of a device or the data may also include one or more viewability variables and/or other data. In some instances, the data may be associated with a unique identifier, such as that for a content item request to which the data to effect display of the content item is responsive. In some implementations, the script may be configured to directly determine whether the content item is viewed. In other implementations, the script may receive input from another script that monitors a viewable region with respect to the displayed resource and content item.

The script or the other script that monitors the viewable region may determine whether the content item is viewed based on data indicating that at least a predetermined percentage of the pixels of the content item is visible within a viewable region of the device to which the data to effect display of the selected content item is outputted, such as that described above in reference to FIG. 3. In some implementations, the predetermined percentage of the pixels may be from 0% to 100%, inclusive. The predetermined percentage may be, for example 50% of the pixels. In some implementations, the determination that the content item is viewed may also include a period of time for at least the predetermined percentage of the pixels of the served content item to be within the viewable region, such as that described above in reference to FIG. 3. For example, period of time may be at least 0.5 seconds, 1 second, 2 seconds, 3 seconds, 4 seconds, 5 seconds, etc. In one example, the period of time may be 1 second. In some implementations, the determination of whether a served content item is viewed may be based upon data indicating that a measurement pixel is within the viewable region, such as that described above in reference to FIG. 3. In some instances, several measurement pixels may be utilized. In yet other implementations, regions of several pixels of the served content item may be utilized to determine whether the served content item is viewed, such as that described above in reference to FIG. 3. Of course, still further implementations to determine whether the served content item has been viewed relative to the viewable region may be used as well.

The content item selection system 108 receives data indicating whether the content item was viewed and data indicative of one or more viewability variables (ACT 804). In some instances, the received data indicating whether the content item was viewed may be the data outputted by the script. In other instances, the content item selection system 108 may receive data indicating that the content item was not viewed. For example, the content item selection system 108 may receive data or determine that the content item was not viewed if a predetermined period of time elapses without receiving data indicating that the content item was viewed from the script associated with the content item. The predetermined period of time may be, for example, one hour, two hours, three hours, four hours, eight hours, 24 hours, a week, etc.

The data indicative of one or more viewability variables may be received as part of the data indicating whether the content item was viewed from the script or the data indicative of one or more viewability variables may be received from another source (e.g., another script, in response to a request to a browser on which the content item is presented, etc.).

The data indicative of the one or more viewability variables may be based on characteristics of the user device (e.g., a type of user device, a display type of a user device, dimensions of the display), characteristics of a web browser executed on the user device (e.g., a type of web browser), settings associated with the user device (e.g., a display resolution, whether third-party content item blocking services are implemented), settings associated with the web browser executed on the user device (e.g., a height of a web browser window, a width of a web browser window, a text size setting of the web browser of the user device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser), and/or characteristics of the resource with which the content item is to be presented (e.g., a position of the content item slot in the resource, a category of the resource, a type of the resource, an interactivity level of the resource, a ranking of the resource, a popularity of the resource). The data indicating whether the content item was viewed and the one or more viewability variables are matched and stored, such as in the viewability database 160.

The content item selection system 108 may generate a view probability predictive model based on the received data (ACT 806). The content item selection system 108 may generate the view probability predictive model using logistic regression based on the received data, as described in greater detail herein. The view probability predictive model may be stored, such as in the viewability database 160, and/or used by the content selection system 108 or output to another system.

Figure 8B:
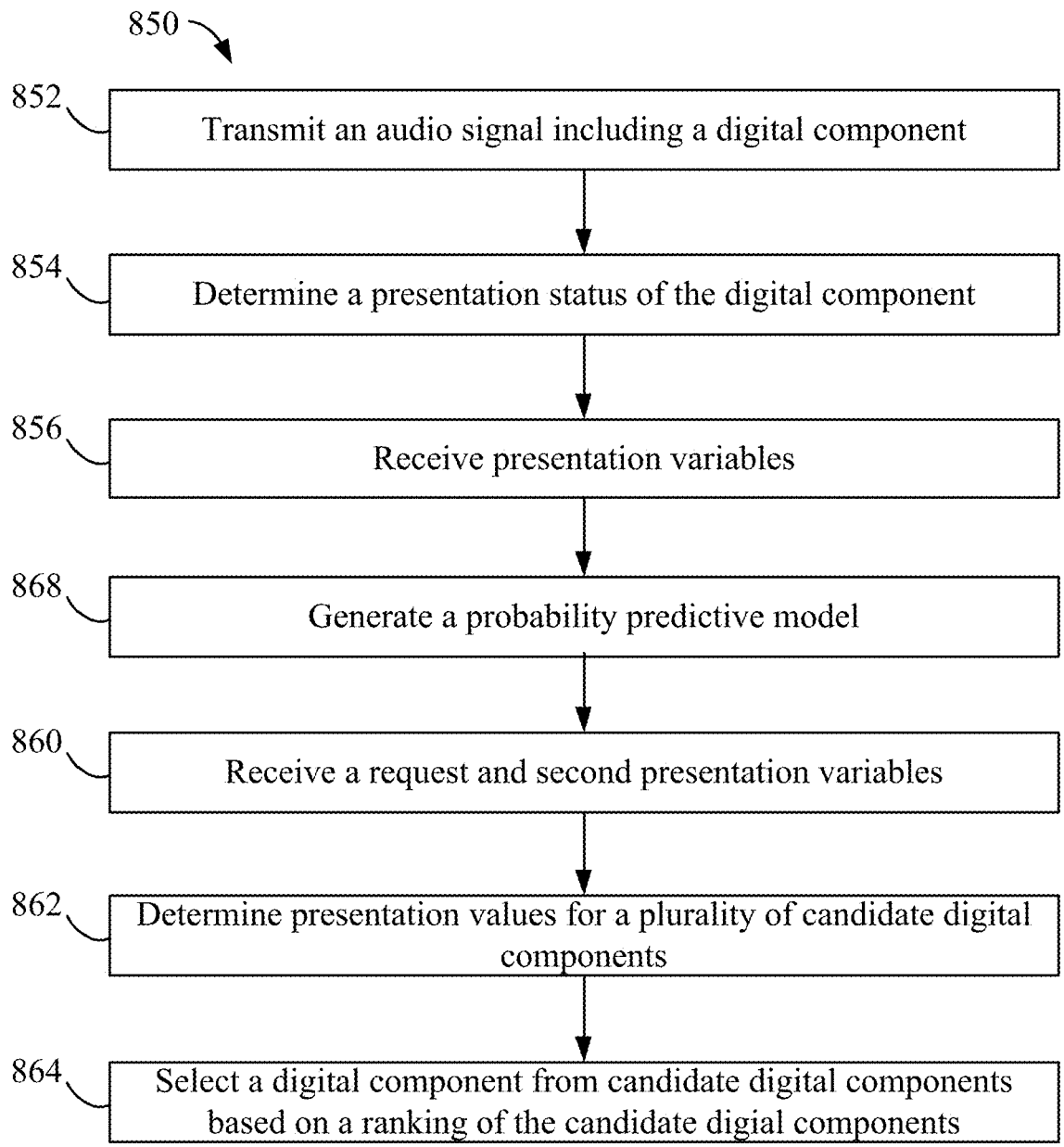
FIG. 8B illustrates a flow diagram of an example method to determine data status.

FIG. 8B illustrates a flow diagram of an example method 850 to determine data status. The method 800 can include transmitting, to a first client computing device, an audio signal that can include a digital component (ACT 852). The method 800 can include determining a presentation status of the digital component within the audio signal (ACT 854). The method 800 can include receiving, from the first client computing device, first presentation variables (ACT 856). The method 800 can include generating a presentation probability predictive model (ACT 858). The method 800 can include receiving, from the first client computing device, second presentation variables and a request (ACT 860). The method 800 can include determining a presentation value for each of a plurality of candidate digital components (ACT 862). The method 800 can include selecting a second digital component from the plurality of digital components based on a ranking of the candidate digital components (ACT 864).

As set forth above, the method 800 can include transmitting, to a first client computing device, an audio signal comprising a digital component (ACT 852). The digital component can be transmitted to a client computing device via the interface of the data processing system. The digital component can be included in an audio file that can be transmitted to the client computing device as a packetized auto signal. In some implementations, a copy of the digital component can be transmitted to a plurality of different client computing devices.

The method 800 can include determining a presentation status of the digital component within the audio signal (ACT 854). The presentation status can indicate whether the digital component was presented via the first client computing device. In some implementations, the data processing system can determine that the digital component was presented when a midpoint of the digital component is played by a client computing device. For example, the digital component can have a known, total length when audibly played by a speaker of a client device. The midpoint can be the total length of the digital component divided by two. When the client device plays half of the digital component it can transmit an indication to the data processing system indicating that a flag of the presentation status should be set indicating that the digital component was played. In some implementations, when non-midpoint locations of the digital component are reached the digital component can be flagged as having been played by the client computing device. For example, the non-midpoint locations can be located 75%, 80%, 85%, 90%, or at 95% through the total length of the digital component. In other implementations, the client computing device transmits the indication that the digital component was played when 100% of the digital component is played. In other implementations, the client computing device can transmit the indication that the digital component was played as soon as the client computing device begins to play the digital component.

The method 800 can include receiving, from the first client computing device, first presentation variables (ACT 856). The first presentation variables can be also be referred to as viewability variables. The set of first presentation variables may be based on characteristics of the client computing device (e.g., a type of user device, a display type of a user device, speaker power of the user device), characteristics of an application executing on the user device (e.g., a type of web browser or assistant application), settings associated with the user device (e.g., speaker quality, whether third-party content item blocking services are implemented), and/or characteristics of the resource with which the digital component to be presented (e.g., a position of the content item slot in the resource, a category of the resource, a type of the resource, an interactivity level of the resource, a ranking of the resource, a popularity of the resource).

The method 800 can include generating a presentation probability predictive model (ACT 858). The presentation probability prediction model can be generated by the prediction component of the data processing system. The model can provide a probability that a future served digital component will be played via the speaker of the client computing device to a user. The model can be based on the presentation status of the digital component and the first presentation variables. As discussed above, the digital component can be transmitted to a plurality of client computing devices. The model can also be based on the presentations variables from the plurality of client computing device. The model can be based on a logistic regression of the prior received presentation variables as discussed above.

The method 800 can include receiving, from the first client computing device, second presentation variables (ACT 860). The presentation variables can be sent to the data processing system within an input audio signal. The input audio signal can also include a request and a trigger keyword. The data processing system can include a natural language processor component that can receive the input audio signal. The natural language processor component can parse the input audio signal into a request and a trigger keyword. In some implementations, the request and the trigger keyword can be recorded by a sensor at the second client computing device. The presentation variables can be included in the data packets transmitted from the second client computing device to the data processing system with the input audio signal. The presentation variables can include or be based on the trigger keyword. For example, one presentation variable can be an estimated audio signal length that is associated with the trigger keyword. For example, the estimated audio signal length to be relatively longer for a trigger word that is likely to initiate a conversation between the client computing device and the service provider device. In some implementations, the method can include selecting, by a content selector component of the data processing system, one or more digital components based on the request and the trigger keywords include input audio signal. The content selector component can select a plurality of digital components that can fulfill the request. The plurality of selected digital components can be referred to as candidate digital components.

The method 800 can include determining a presentation value for each of the plurality of candidate digital components (ACT 862). The presentation value for each of the candidate digital components can be based the second presentation variables and the presentation probability predictive model. In some implementations, the prediction component, can determine a presentation value for each of the plurality of candidate digital components that were selected to fulfill the request. The presentation value for each of the plurality of candidate digital components can be based the second presentation variables and the presentation probability predictive model. The prediction component can rank each of the plurality of digital components based on the respective presentation values for each of the plurality of digital components. In some implementations, the presentation value for each of the plurality of candidate digital components can be based on a bid value associated with each of the can candidate digital components.

The method 800 can include selecting a second digital component for transmission to the second client computing device (ACT 864). The digital component can be selected for transmission within a second audio signal based on the presentation value being above a predetermined threshold value. The digital component may be selected based on an auction performed by the content item selection system. The content item auction can include receiving bids from the content provider device. The bid can be a bid to present the digital components provided by the content provider device for display on the client computing device. The auction may include digital components and associated bids based on whether the digital component is presented on the client computing device in part, presented on the client computing device in whole, whether a user performs a specific action based on the presentation of the digital component. The content item selection system can select the digital component based on the bids provided by the content provided devices and the presentation value. By way of example, an auction may be between a digital component having a bid based on whether the digital component is presented in full and a second digital component having a bid based on whether the digital component is acted upon. A determined probability for the full presentation of the digital component may be high, such as 0.8 (80%) while a predicted value of the digital component being acted upon may be low, such as 0.05 (5%). If, for example, the bid based on whether the content item is presented in full is $1.00, then the resulting determined value may be high, such as $0.80=0.8*$1.00. If the bid based on whether the content item is acted upon is $5.00, then the resulting determined value may be low, such as $0.25=0.05*$5.00. Accordingly, the content item selection system can select the content item having the bid based on whether the content item is viewed in full. As illustrated, when the presentation value is included in the auction selection, digital component associated with the higher bid ($5.00) is not selected in favor of the digital component associated with the lower bid ($1.00). Once a digital component is selected from the candidate digital components, the interface of the data processing system (or service provider device) can transmit data packets that include an output signal and the selected digital component to the client computing device.

Figure 9:
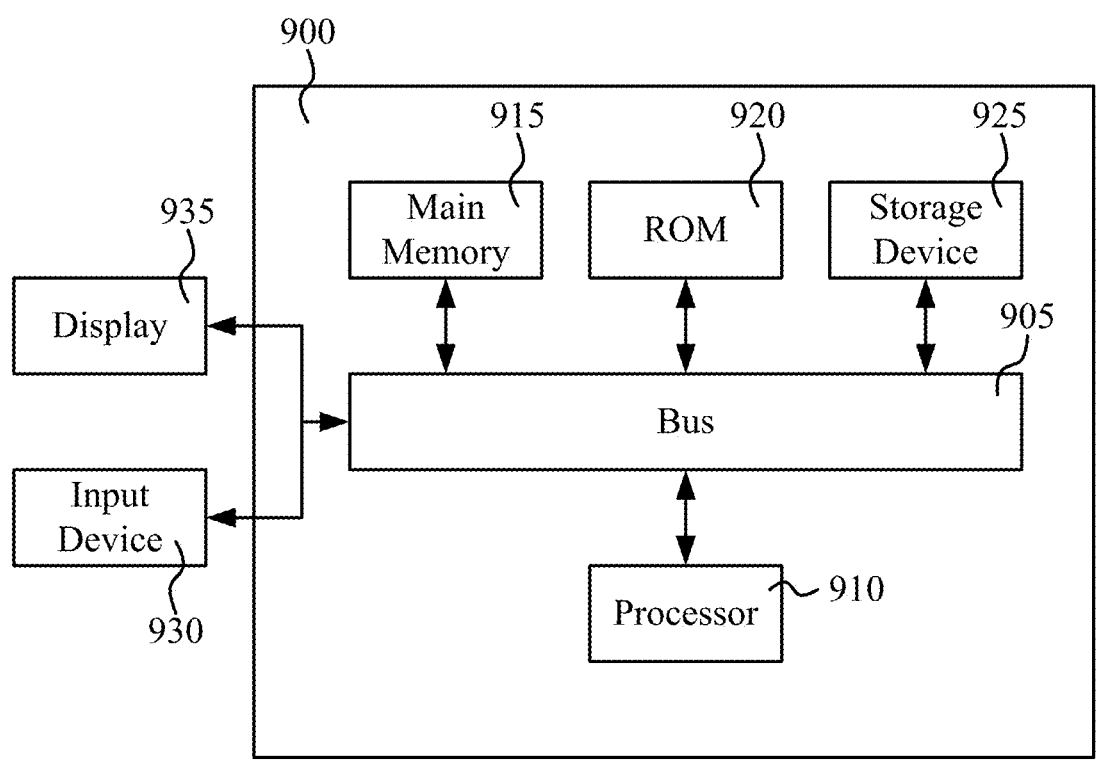
FIG. 9 is a block diagram illustrating a general architecture for a computer system that may be employed to implement various elements of the systems and methods described and illustrated herein.

FIG. 9 is a block diagram of a computer system 900 that can be used to implement the client computing device 110, content item selection system 108, content provider device 102, etc. The computing system 900 includes a bus 905 or other communication component for communicating information and a processor 910 or processing module coupled to the bus 905 for processing information. The computing system 900 can also include one or more processors 910 or processing modules coupled to the bus for processing information. The computing system 900 also includes main memory 915, such as a RAM or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a ROM 920 or other static storage device coupled to the bus 905 for storing static information and instructions for the processor 910. A storage device 925, such as a solid state device, magnetic disk or optical disk, is coupled to the bus 905 for persistently storing information and instructions. Computing device 900 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 900 may be coupled via the bus 905 to a display 935, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 930, such as a keyboard including alphanumeric and other keys, may be coupled to the bus 905 for communicating information and command selections to the processor 910. In another implementation, the input device 930 may be integrated with the display 935, such as in a touch screen display. The input device 930 can include a cursor control, such as a mouse, a trackball, or cursor direction keys, for communicating direction information and command selections to the processor 910 and for controlling cursor movement on the display 935.

According to various implementations, the processes and/or methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes and/or method steps described herein. One or more processors in a multi-processing arrangement may also be employed to execute the instructions contained in main memory 915. In alternative implementations, hard-wired circuitry may be used in place of or in combination with software instructions to effect illustrative implementations. Thus, implementations are not limited to any specific combination of hardware circuitry and software.

Although an example computing system 900 has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular embodiments. Certain features described in this specification in the context of separate embodiments can also be implemented in combination in a single implementation. Conversely, various features described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A system to determine data status, the system comprising:
a data processing system including a memory and one or more processors to:
receive, from a first client computing device, a first input audio signal acquired via a sensor of the first client computing device;
parse the first input audio signal received from the first client computing device to identify a first request;
determine, using the first request, a series of actions corresponding to a series of candidate digital components;
transmit, to the first client computing device, a first output audio signal comprising a first digital component from the series of candidate digital components;
determine a presentation status of the first digital component within the first audio signal, the presentation status indicating whether the first digital component was presented via the first client computing device;
receive, from the first client computing device, first presentation variables; generate a presentation probability predictive model based on the presentation status of the first digital component, the first presentation variables, and a data set comprising prior presentation statuses and prior presentation variables determined for a plurality of client computing devices previously served an audio signal;
receive, from the first client computing device, a second input audio signal acquired via the sensor of the first client computing device and second presentation variables;
identify the second input audio signal received from the first client computing device to identify a second request;
determine a presentation value for each of a remainder in the series of candidate digital components based on the second presentation variables and the presentation probability predictive model;
determine to bypass a second digital component from the series of candidate digital components corresponding to the series of actions determined using the first request, to select a third digital component from the series of candidate digital components based on the second request and a ranking of the presentation values for each of the remainder in the series of candidate digital components; and transmit, to the first client computing device, a second audio signal comprising the third digital component selected from the series of candidate digital components.

2. The system of claim 1, comprising a natural language processor component to:
receive, from the first client computing device, an input audio signal, the input audio signal detected by a sensor of the first client computing device; and
parse the input audio signal into the second request and a trigger keyword.

3. The system of claim 2, wherein the second presentation variables are based on the trigger keyword and the second request.

4. The system of claim 2, comprising a content selector component to:
select the third digital component for transmission to the first client computing device responsive the second request and the trigger keyword.

5. The system of claim 1, comprising a prediction component to:
determine the presentation value for each of the remainder in the series of candidate digital components based on the second presentation variables and the presentation probability predictive model;
rank the plurality of digital components based on the respective presentation values for each of the remainder in the series of candidate digital components; and
select the third digital component from the series of candidate digital components based on the ranking of the series of digital components.

6. The system of claim 1, wherein the presentation status indicates whether a midpoint of the digital component was presented via the first client computing device.

7. The system of claim 1, comprising the data processing system to:
determine the presentation value for the digital component based on a bid value of the digital component.

8. The system of claim 1, comprising:
an interface to transmit data packets comprising the second audio signal to the first client computing device to cause an audio driver component executed by the first client computing device to drive a speaker to generate an accusative wave corresponding to the second audio signal.

9. The system of claim 1, comprising the data processing system to:
determine a first bid price and a first bid type of the second digital component;
identify a candidate digital component having a second bid price greater than the first bid price and a second bid type;
determine the presentation value for the second digital component based on the second presentation variables, the presentation probability predictive model, the first bid price, and the first bid type;
determine a second value for the third candidate digital component based on the second presentation variables, the presentation probability predictive mode, the second bid price and the second bid type; and
select the third digital component for transmission to the first client computing device responsive to the ranking indicating that the presentation value is higher than the second presentation value.

10. The system of claim 1, wherein the presentation probability predictive model determines a probability that the second digital component is played by the first client computing device past a midpoint of the digital component.

11. A method to determine data status, the method comprising:
receiving, from a first client computing device, a first input audio signal acquired via a sensor of the first client computing device;
parsing the first input audio signal received from the first client computing device to identify a first request;
determining, using the first request, a series of actions corresponding to a series of candidate digital components;
transmitting, to the first client computing device, a first output audio signal comprising a first digital component from the series of candidate digital components;
determining a presentation status of the first digital component within the first audio signal, the presentation status indicating whether the first digital component was presented via the first client computing device;
receiving, from the first client computing device, first presentation variables;
generating a presentation probability predictive model based on the presentation status of the first digital component, the first presentation variables, and a data set comprising prior presentation statuses and prior presentation variables determined for a plurality of client computing devices previously served an audio signal;
receiving, from the first client computing device, a second input audio signal acquired via the sensor of the first client computing device and second presentation variables;
identifying the second input audio signal received from the first client computing device to identify a second request;
determining a presentation value for each of a remainder in the series of candidate digital components based on the second presentation variables and the presentation probability predictive model;
determining to bypass a second digital component from the series of candidate digital components corresponding to the series of actions determined using the first request, to select a third digital component from the series of candidate digital components based on the second request and a ranking of the presentation values for each of the plurality of candidate digital components; and
transmitting, to the first client computing device, a second audio signal comprising the third digital component selected from the series of candidate digital components.

12. The method of claim 11, comprising:
receiving, from the first client computing device and by a natural language processor component, an input audio signal, the input audio signal detected by a sensor of the first client computing device; and
parsing, by the natural language processor component, the input audio signal into the second request and a trigger keyword.

13. The method of claim 12, wherein the second presentation variables are based on the trigger keyword and the second request.

14. The method of claim 12, comprising:
selecting, by a content selector component, the third digital component for transmission to the first client computing device responsive the second request and the trigger keyword.

15. The method of claim 11, comprising:
determining, by a prediction component, the presentation value for each of the remainder in the series of candidate digital components based on the second presentation variables and the presentation probability predictive model;
ranking, by the prediction component, the remainder in the series of candidate digital components based on the respective presentation values for each of the plurality of candidate digital components; and
selecting, by the prediction component, the third digital component from the series of candidate digital components based on the ranking of the series of candidate digital components.

16. The method of claim 11, wherein the presentation status indicates whether a midpoint of the digital component was presented via the first client computing device.

17. The method of claim 11, comprising:
determining the presentation value for the second digital component based on a bid value of the digital component.

18. The method of claim 11, comprising:
transmitting data packets comprising the second audio signal to the first client computing device to cause an audio driver component executed by the first client computing device to drive a speaker to generate an accusative wave corresponding to the second audio signal.

19. The method of claim 11, comprising:
determining a first bid price and a first bid type of the second digital component;
identifying a candidate digital component having a second bid price greater than
the first bid price and a second bid type;
determining the presentation value for the second digital component based on the second presentation variables, the presentation probability predictive model, the first bid price, and the first bid type;
determining a second value for the third candidate digital component based on the second presentation variables, the presentation probability predictive mode, the second bid price and the second bid type; and
selecting the third digital component for transmission to the first client computing device responsive to the ranking indicating that the presentation value is higher than the second presentation value.

20. The method of claim 11, wherein the presentation probability predictive model determines a probability that the second digital component is played by the first client computing device past a midpoint of the digital component.

* * * * *